United States Patent
Isogai et al.

(10) Patent No.: US 6,894,605 B2
(45) Date of Patent: May 17, 2005

(54) APPARATUS AND METHOD FOR CONTROLLING A DISTANCE BETWEEN TRAVELING VEHICLES AND ACTUATING A WARNING DEVICE AND A RECORDING MEDIUM FOR STORING RELATED PROGRAM

(75) Inventors: Akira Isogai, Anjo (JP); Takao Nishimura, Nagoya (JP); Toyohito Nozawa, Kariya (JP); Eiji Teramura, Okazaki (JP); Hisanao Kato, Oobu (JP); Norihiko Sakai, Kariya (JP)

(73) Assignee: Denso Corporation, Kariya (JP)

( * ) Notice: Subject to any disclaimer, the term of this patent is extended or adjusted under 35 U.S.C. 154(b) by 307 days.

(21) Appl. No.: 09/824,707

(22) Filed: Apr. 4, 2001

(65) Prior Publication Data

US 2001/0039472 A1 Nov. 8, 2001

(30) Foreign Application Priority Data

Apr. 7, 2000 (JP) ........................................ 2000-106626

(51) Int. Cl.$^7$ ................................................ B60Q 1/00
(52) U.S. Cl. ...................... 340/435; 340/436; 340/438; 340/903; 340/904; 701/1; 701/36; 701/96; 701/301
(58) Field of Search ................................. 340/903, 438, 340/436, 904, 435; 701/36, 1, 301, 96

(56) References Cited

U.S. PATENT DOCUMENTS

| 5,396,426 | A | * | 3/1995 | Hlbino | 701/301 |
| 5,502,432 | A | | 3/1996 | Ohmamyuda et al. | |
| 5,684,473 | A | * | 11/1997 | Hibino et al. | 340/903 |
| 6,014,601 | A | * | 1/2000 | Gustafson | 701/45 |
| 6,018,308 | A | * | 1/2000 | Shirai | 342/70 |
| 6,351,702 | B1 | * | 2/2002 | Tange et al. | 701/96 |
| 6,415,230 | B1 | * | 7/2002 | Maruko et al. | 701/301 |

FOREIGN PATENT DOCUMENTS

| JP | 5-105047 | 4/1993 |
| JP | 8-132996 | 5/1996 |
| JP | 2562090 | 9/1996 |

* cited by examiner

*Primary Examiner*—Julie Lieu
(74) *Attorney, Agent, or Firm*—Posz & Bethards, PLC

(57) ABSTRACT

Recognition result of an objective recognized as a preceding vehicle is analyzed to judge whether this objective is correctly detected as a vehicle or not. A relative acceleration is calculated based on a relative speed corresponding to the objective when analysis result shows properness of this objective as a vehicle. The relative acceleration is set to 0 when analysis result shows improperness of the objective. An inter-vehicle control amount is corrected based on the obtained relative acceleration. The distance between the preceding vehicle and the controlled vehicle is controlled based on the corrected inter-vehicle control amount.

34 Claims, 25 Drawing Sheets

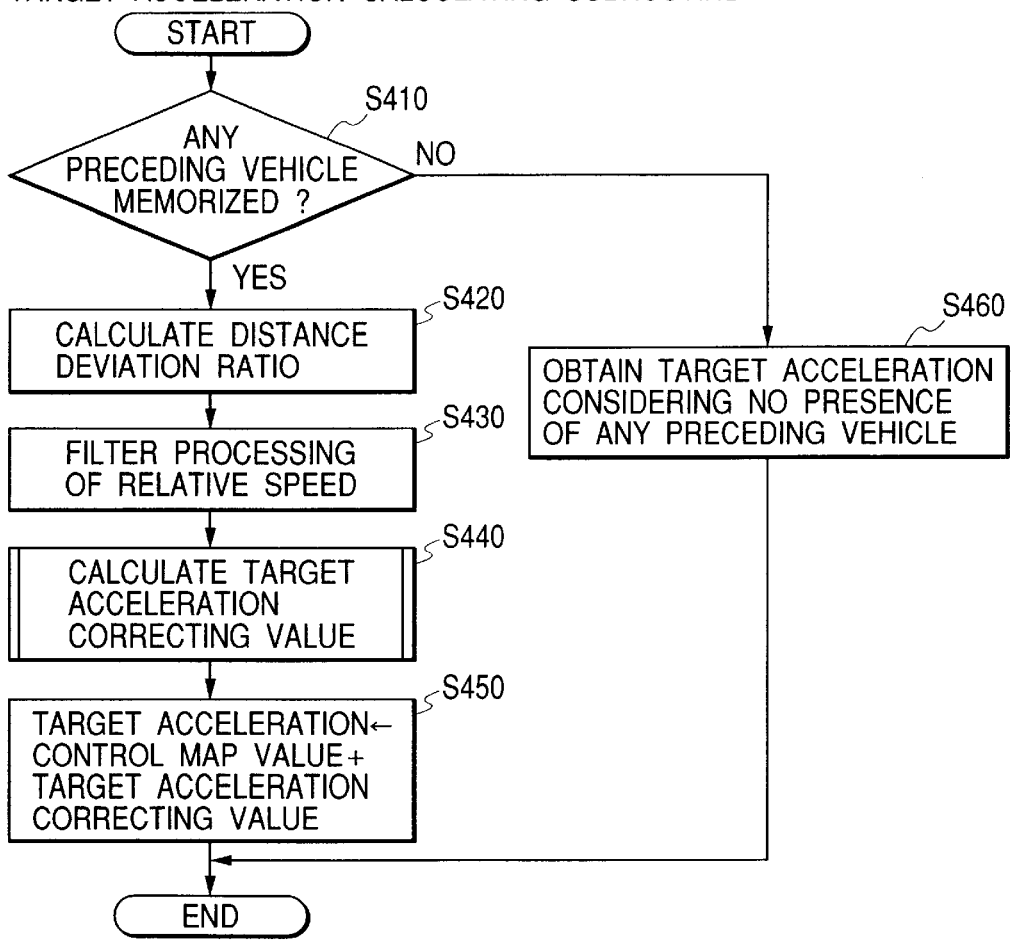

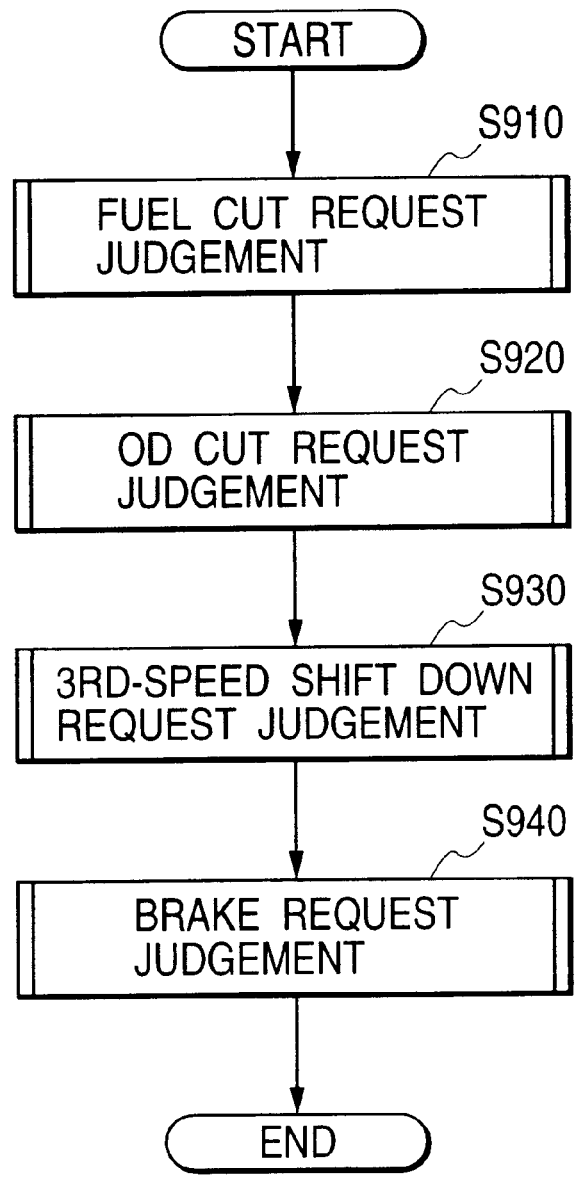

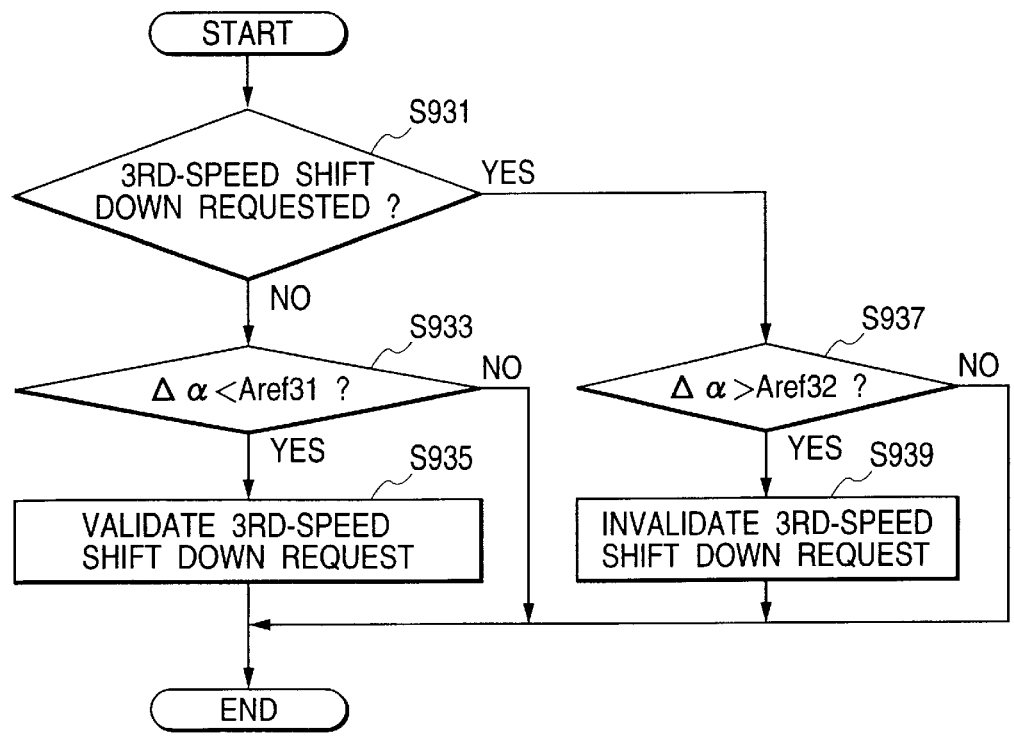

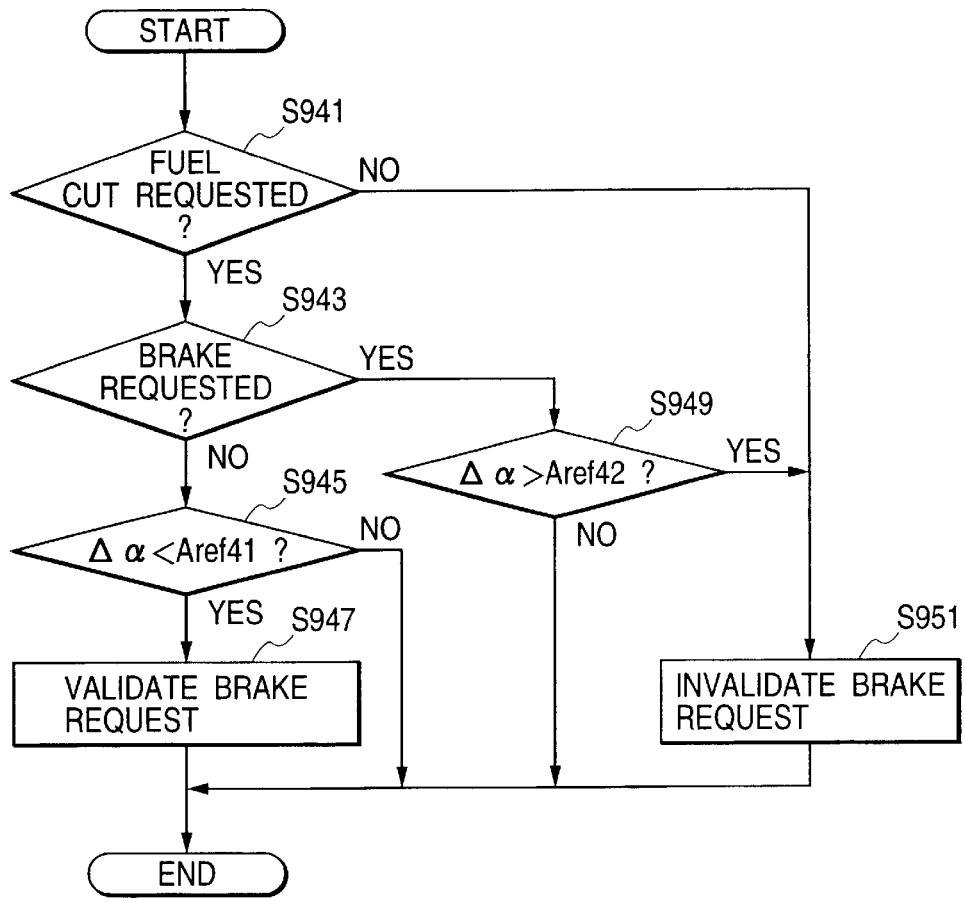

WARNING GENERATION JUDGING SUBROUTINE

WARNING DISTANCE CORRECTING MAP

APPARATUS AND METHOD FOR CONTROLLING A DISTANCE BETWEEN TRAVELING VEHICLES AND ACTUATING A WARNING DEVICE AND A RECORDING MEDIUM FOR STORING RELATED PROGRAM

BACKGROUND OF THE INVENTION

The present invention relates to an apparatus and a method for controlling a target distance between two traveling vehicles and actuating a warning device and a recording medium for storing related program.

To reduce the driver's burden, an apparatus for automatically controlling a distance between two traveling vehicles is conventionally proposed. According to a conventional automatic distance control, the vehicle is accelerated or decelerated based on a difference between an actual distance and a predetermined target distance, a relative speed, and a relative acceleration between two traveling vehicles. For example, Unexamined Japanese patent publication 5-105047 discloses a control system which calculates a target throttle opening degree based on a difference between an actual inter-vehicle distance and a target distance as well as a relative speed between two traveling vehicles, and calculates a target hydraulic braking pressure based on an acceleration of a preceding vehicle. The vehicle is accelerated or decelerated based on the target throttle opening degree and the target hydraulic braking pressure thus obtained, so as to eliminate unpleasant anti-accelerative feeling given to passengers aboard on vehicle at the time the braking is unintendedly applied due to a tiny change of relative speed. The target hydraulic braking pressure, once calculated, is not reduced during the braking operation.

However, according to the above-described conventional control system, the control system may erroneously detect the relative speed or relative acceleration as a negative value due to measuring error of a distance sensor. In such a case, to prevent two vehicles from approaching too closely, the control system activates the braking device to decelerate the following vehicle to maintain an adequate distance between two vehicles. This will give unpleasant feeling to passengers aboard on the vehicle since there is no circumstances requiring the braking operation.

In general, the relative acceleration is obtained by differentiating a relative speed, for example, according to the following formula.

{Relative speed (present value)−Relative speed (previous value)}/ Distance measuring period However, the relative acceleration calculated by using this formula tends to include noise if the measuring accuracy of the distance sensor is insufficient. The relative acceleration signal including such a noise component will induce erroneous activation of the braking device and cause the above-described problem.

Some of distance sensors, such as laser radar, cannot directly detect a relative speed. Therefore, the relative speed is calculated based on change of distance. The relative acceleration is obtained as a second-derivative value of the distance. Thus, measuring error of the distance sensor gives very large influence to the accuracy of calculated relative acceleration.

In this manner, accuracy of the relative acceleration has very important role in the inter-vehicle control performed based on the relative acceleration.

Similar problem occurs in a warning control for generating warning (e.g., sound, indication or the like) when two traveling vehicles are too closely positioned. For example, the unexamined Japanese patent publication 8-132996 discloses a warning system which performs warning calculation based on the relative speed and the relative acceleration. If the relative acceleration is a signal including a significant noise component, the warning operation will result in error.

SUMMARY OF THE INVENTION

An object of the present invention is to improve drive feeling by using accurate and reliable relative acceleration in the inter-vehicle control or in warning control.

To accomplish this and related objects of the present invention, the present invention provides a first inter-vehicle control method or apparatus for controlling a distance between two traveling vehicles. According to the first inter-vehicle control method or apparatus, recognition processing is performed to calculate at least a relative position and a relative speed of an objective to be recognized with respect to a controlled vehicle installing a distance control apparatus. A preceding vehicle traveling ahead of the controlled vehicle is selected based on recognition result. An inter-vehicle control amount is calculated based on a difference between an actual inter-vehicle physical amount representing an actual distance between the selected preceding vehicle and the controlled vehicle and a target inter-vehicle physical amount representing a target distance between the selected preceding vehicle and the controlled vehicle, and a relative speed between the controlled vehicle and the selected preceding vehicle. Then, the distance control apparatus is actuated based on the calculated inter-vehicle control amount, thereby accelerating or decelerating the controlled vehicle so as to maintain an appropriate distance between two traveling vehicles.

Furthermore, according to the first inter-vehicle control method or apparatus, the recognition result of the objective recognized as the preceding vehicle is analyzed to judge whether the objective is correctly detected as a vehicle or not. Then, a relative acceleration is calculated based on the relative speed corresponding to the objective only when analysis result shows properness of the objective as a vehicle. Then, the inter-vehicle control amount is corrected based on the calculated relative acceleration. And, the distance between the preceding vehicle and the controlled vehicle is controlled based on the corrected inter-vehicle control amount.

Using the inter-vehicle control amount being thus corrected according to the relative acceleration brings the following effects in the inter-vehicle control.

First, when a preceding vehicle decelerates abruptly, the present invention makes it possible to quickly detect such behavior without substantial delay. In other words, the vehicle control, i.e., deceleration control in this case, can be executed at adequate timing. The relative acceleration generally represents the deceleration degree of a preceding vehicle when the following vehicle is traveling at a constant speed. If the deceleration degree of a preceding vehicle is large, the relative acceleration will be large correspondingly. In such a case, to avoid collision of vehicles, the succeeding vehicle should start decelerating as quickly as possible.

Change of relative speed or change of distance between two traveling vehicles are comparatively dull and cannot respond so quickly to sudden deceleration of a vehicle. On the other hand, change of relative acceleration is very sensitive to such sudden change of vehicle behavior.

Therefore, starting the decelerating operation based on the relative acceleration is essentially important in realizing a reliable inter-vehicle control system.

Furthermore, in a situation a preceding vehicle is repeating moderate acceleration and deceleration, performing the inter-vehicle control based on the relative acceleration brings good result in suppressing fluctuation (i.e., hunting) of traveling speed of a succeeding vehicle.

However, if a detected objective is not a vehicle, relying on the relative acceleration in the inter-vehicle control will induce troubles due to its sensitiveness.

In view of the above, the first inter-vehicle control method or apparatus of the present invention relies on the relative acceleration only when the objective is properly detected as a vehicle. In other words, the first inter-vehicle control method or apparatus of the present invention neglects the relative acceleration when the detected objective seems to be different from a vehicle or to be a vehicle with measuring error in distance, thereby avoiding inclusion of error or noise and as a result improving drive feeling.

The present invention further provides a second inter-vehicle control method or apparatus for controlling a distance between two traveling vehicles. The second inter-vehicle control method or apparatus is similar to the above-described first inter-vehicle control method or apparatus except that the relative acceleration is set to 0 when analysis result shows improperness of the objective as a vehicle.

In this invention, "inter-vehicle physical amount" is not strictly limited to the distance itself. For example, as a physical amount representing a distance between a preceding vehicle and a controlled vehicle, it is possible to introduce a concept of "distance time" which is obtained by dividing the distance between two vehicles by a traveling speed of the controlled vehicle.

In practice, the inter-vehicle distance can be measured by irradiating a laser beam or transmission wave to a preceding vehicle to detect a time required until a reflected laser beam or reflected transmission wave is received. In this case, the detected time is directly used as a physical amount representing the inter-vehicle distance. In this manner, various expressions or definitions can be used for the "inter-vehicle physical amount" of the present invention.

Furthermore, "inter-vehicle control amount" of the present invention is any one of a target acceleration, a deviate acceleration (=target acceleration–actual acceleration), a target torque, a target relative speed or the like.

According to a preferable embodiment of the present invention, a analyzing means judges that the objective corresponding to the preceding vehicle is correctly detected as a vehicle when presence of the objective is recognized continuously for a predetermined time after the objective is newly detected by an objective recognizing means.

When the objective is not continuously recognized for a sufficient time, this objective is considered as being not stable and not reliable. Hence, the relative acceleration of this objective is not relied upon in the inter-vehicle control.

It is also preferable that the analyzing means judges the objective corresponding to the preceding vehicle is correctly detected as a vehicle when the relative acceleration obtained based on the relative speed calculated by the objective recognizing means is within a predetermined range applicable to ordinary vehicles.

When the objective has an excessively large relative acceleration value, this objective is believed to be different from a preceding vehicle. Thus, the relative acceleration of this objective is not relied upon in the inter-vehicle control.

It is also preferable that the analyzing means judges the objective corresponding to the preceding vehicle is correctly detected as a vehicle when a present distance of the preceding vehicle calculated by the objective recognizing means is judged to be an appropriate value based on at least a previously calculated distance value and tolerance of the measured distance.

When continuity between the present distance value and the previous distance value is doubtful, the objective is believed to be not correctly detected. The relative acceleration may become an abnormal value. Thus, the relative acceleration of this objective is not relied upon in the inter-vehicle control.

It is also preferable that the objective recognizing means is capable of recognizing configuration of an objective, and the analyzing means judges that the objective corresponding to the preceding vehicle is correctly detected as a vehicle when objective configuration recognized by the objective recognizing means is recognizable as a vehicle.

More specifically, the analyzing means checks both a lateral length and a longitudinal length of the objective in the judgement of configuration of the object. It is also possible to use an aspect ratio of the lateral length and the longitudinal length.

It is also preferable that the analyzing means judges the objective corresponding to the preceding vehicle is correctly detected as a vehicle when change of objective configuration recognized by the objective recognizing means is within a range applicable to ordinary vehicles.

Even if the objective configuration is similar to that of a vehicle, this objective cannot be identified as a vehicle when the change of objective configuration is different from that of a vehicle.

It is also preferable that the analyzing means judges the objective corresponding to the preceding vehicle is correctly detected as a vehicle when the distance and the relative speed of the objective is within a range applicable to ordinary traffic environment. For example, an approaching time can be obtained by dividing the distance to the preceding vehicle by the relative speed. The approaching time will not be excessively small according to the ordinary traffic environment.

Instead of performing each of the above-described judgements by alone, it is also preferable that the analyzing means judges the objective corresponding to the preceding vehicle is correctly detected as a vehicle only when all of the conditions in these judgements are satisfied.

It is also preferable that a correcting means applies guard processing to the calculated relative acceleration so that the relative acceleration value can be limited by at least one of upper and lower limit values which are determined considering actual relative acceleration of ordinary vehicles, and the correcting means corrects the inter-vehicle control amount based on the relative acceleration being applied the guard processing.

It is also preferable that the correcting means applies filter processing to the calculated relative acceleration to correct the inter-vehicle control amount based on the relative acceleration being applied the filter processing. More specifically, the filter processing is performed by using a weak filtering factor when sharp response is necessary and by using a strong filtering factor when sharp response is not necessary. In this case, situation requiring sharp response is judged by checking whether or not a distance from the controlled vehicle to the preceding vehicle is equal to or smaller than a predetermined value and whether or not an absolute value of the relative speed is equal to or smaller than a predetermined value. The reason why strong filtering processing is performed when no sharp response is required is to eliminate or suppress noise or error caused by incorrectly or unstably obtained relative acceleration.

For example, the correcting means performs the filter processing with the strong filtering factor, after it is once judged that the preceding vehicle is correctly detected as a vehicle, if it is later judged that the preceding vehicle is incorrectly detected as a vehicle even if the preceding vehicle is present at an appropriate position where the preceding vehicle is accurately detectable.

It is also preferable that the correcting means multiplies the relative acceleration by a predetermined gain and corrects the inter-vehicle control amount based on the relative acceleration being gain multiplied.

For example, the gain is set to a relatively small value when the preceding vehicle is far from the controlled vehicle than a predetermined distance. In general, a driver needs not pay much attention to a preceding vehicle when the preceding vehicle is positioned far from his own vehicle. Thus, the gain value can be reduced to a small value (including 0) in such a situation.

For example, the gain is set to a relatively large value when the relative acceleration is a negative value compared with a gain value used when the relative acceleration is a positive value.

When compared with acceleration, delay of decelerating operation will give uneasy feeling to the passengers in the vehicle. Thus, when the preceding vehicle suddenly decelerates, the decelerating device of the succeeding vehicle should be actuated as quickly as possible.

It is also preferable that guard processing is applied to the relative acceleration being gain multiplied so that the relative acceleration value can be limited by at least one of upper and lower limit values, and the inter-vehicle control amount is corrected based on the relative acceleration being applied the guard processing.

Furthermore, it is preferable that the correcting means calculates a correction amount based on the relative acceleration and corrects the inter-vehicle control amount based on the calculated correction amount. For example, a one-dimensional map with input of relative acceleration can be used to calculate the correction amount. Using map data for such correction is advantageous in that non-linear correction characteristics can be arbitrarily set.

It is also preferable the correcting means adds a correction amount based on the relative acceleration to a target acceleration serving as the inter-vehicle control amount. Alternatively, it is possible to use a three-dimensional map defined by derivative inter-vehicle distance, relative speed, and relative acceleration.

Furthermore, the present invention provides a first inter-vehicle warning method or apparatus. According to the first inter-vehicle warning method or apparatus, recognition processing is performed to calculate at least a relative position and a relative speed of an objective to be recognized with respect to a controlled vehicle installing a warning device. A preceding vehicle traveling ahead of the controlled vehicle is selected based on recognition result. The warning device is actuated when an actual inter-vehicle physical amount representing an actual distance between the selected preceding vehicle and the controlled vehicle is shorter than a warning physical amount representing a predetermined warning distance.

Furthermore, according to the first inter-vehicle warning method or apparatus, the recognition result of the objective recognized as the preceding vehicle is analyzed to judge whether the objective is correctly detected as a vehicle or not. Then, a relative acceleration is calculated based on the relative speed corresponding to the objective only when analysis result shows properness of the objective as a vehicle. Then, the warning physical amount is corrected based on the calculated relative acceleration. And, the warning device is controlled based on the corrected warning physical amount.

The present invention further provides a second inter-vehicle warning method or apparatus for actuating the warning device. The second inter-vehicle warning method or apparatus is similar to the above-described first inter-vehicle warning method or apparatus except that the relative acceleration is set to 0 when analysis result shows improperness of the objective as a vehicle.

The above-described preferable and detailed features of the analyzing means, the objective recognizing means, and the correcting means defined for the inter-vehicle control method or apparatus can be equally applied to this inter-vehicle warning method or apparatus.

In this invention, the "warning physical amount" is not strictly limited to the distance itself. For example, it is possible to introduce a concept of "warning distance time" which is obtained by dividing the warning distance by a traveling speed of the controlled vehicle.

However, it should be noted that the warning distance should be increased when the relative acceleration is a negative value (i.e., when two vehicles are approaching each other). When the warning physical amount is corrected by adding a gain multiplied correction value to the relative acceleration, the gain value must be a negative value; i.e., $-\alpha(\alpha>0)$.

Moreover, the present invention provides a first recording medium installable in a computer system for causing the computer system to operate as the objective recognizing means, the selecting means, the inter-vehicle control means, the analyzing means, and the correcting means of the inter-vehicle control apparatus of the present invention. The present invention also provides a second recording medium installable in a computer system for causing the computer system to operate as the objective recognizing means, the selecting means, the warning means, the analyzing means, and the correcting means of the inter-vehicle warning apparatus of the present invention.

For example, programs relating to the inter-vehicle control method or the inter-vehicle warning method of the present invention can be stored in a recording medium, such as a memory (ROM, back-up RAM) or a built-in hard disk drive, which is pre-installable in the microcomputer. Alternatively, it is possible to store the programs in a portable recording medium, such as a floppy disk, a MO (magneto-optical) disk, a CD-ROM, an external hard disk drive and a DVD (digital versatile disk), so that the programs can be arbitrarily loaded from such a recording medium to the microcomputer.

BRIEF DESCRIPTION OF THE DRAWINGS

The above and other objects, features and advantages of the present invention will become more apparent from the following detailed description which is to be read in conjunction with the accompanying drawings, in which:

FIG. 4A is a flowchart showing details of a target acceleration calculating subroutine executed in the main processing procedure shown in FIG. 2;

FIG. 4B is a control map used in the target acceleration calculating subroutine shown in FIG. 4A;

FIG. 6 is a flowchart showing details of deceleration request judging subroutine executed in the main processing procedure shown in FIG. 2;

FIG. 9 is a flowchart showing details of third-speed shift down request judgement performed in the deceleration request judging subroutine shown in FIG. 6;

FIG. 10 is a flowchart showing details of brake request judgement performed in the deceleration request judging subroutine shown in FIG. 6;

DESCRIPTION OF THE PREFERRED EMBODIMENT

A preferred embodiment of the present invention will be explained with reference to attached drawings.

Figure 1:
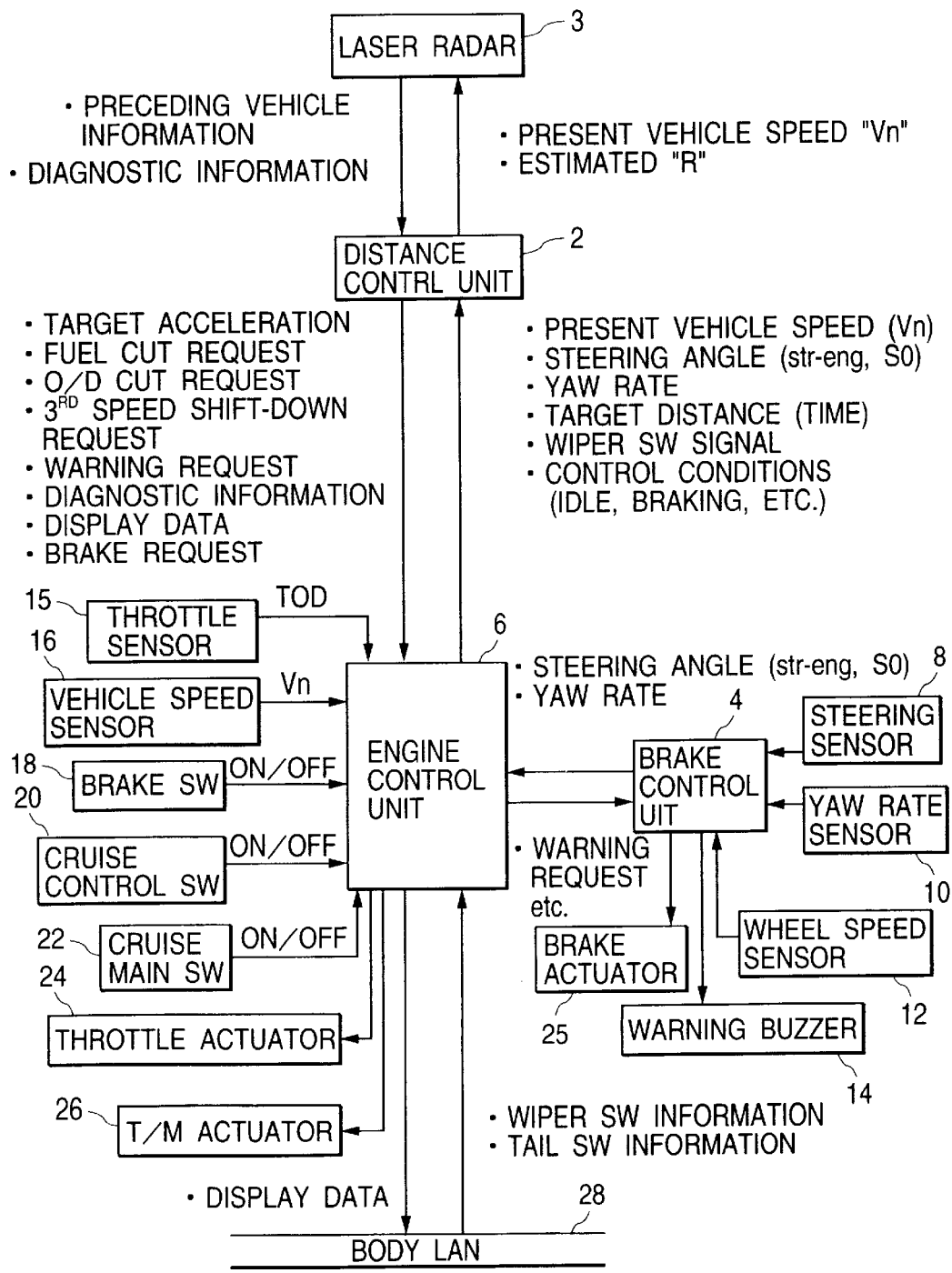
FIG. 1 is a block diagram showing a schematic system arrangement of an inter-vehicle control apparatus for controlling a distance or space between two traveling vehicles in accordance with a preferred embodiment of the present invention.

FIG. 1 shows an integrated control system of an automotive vehicle, comprising a distance control unit 2 for electronically controlling a space or distance between two traveling vehicles, a brake control unit 4 for electronically controlling the braking device for applying a braking force to wheels of the automotive vehicle, and an engine control unit 6 for controlling an internal combustion engine of the automotive vehicle.

The distance control unit 2 is an electronic circuit including a microcomputer connected to the engine control unit 6 and installed in an automotive vehicle (hereinafter referred to as a system's vehicle or a controlled vehicle). The distance control unit 2 receives a present vehicle speed (Vn) signal, a steering angle (str-eng, S0) signal, a yaw rate signal, a target distance (time) signal, a wiper switch signal, and various control condition signals, such as engine idling control and brake control signals, from the engine control unit 6. The distance control unit 2 estimates a curvature radius "R" of the road to travel and sends an estimated curvature radius to a laser radar 3.

The laser radar 3 is an electronic circuit including a laser distance scanner and a microcomputer. The laser distance scanner detects an angle of the preceding vehicle as well as a distance and/or a relative speed of the system's vehicle with respect to the preceding vehicle. The laser radar 3 functions as part of the distance control unit 2. For example, the laser radar 3 calculates the probability of both the preceding vehicle and the system's vehicle traveling on the same traffic lane or zone of a traveling road based on the present vehicle speed (Vn) signal and the estimated curvature radius "R" of the traveling road. The calculated result is sent as the preceding vehicle information to the distance control unit 2. The preceding vehicle information includes the detected distance, the relative speed, and the relative acceleration between the system's vehicle and the preceding vehicle as well as the same lane probability. Furthermore, the laser radar 3 performs diagnosis and sends a resultant diagnosis signal to the distance control unit 2. The laser distance scanner irradiates a laser beam directed toward the traveling direction of the system's vehicle as a transmission radio wave with a predetermined scanning angle and receives the laser beam reflected from a detected object. The laser distance scanner calculates the distance between the system's vehicle and the preceding vehicle in relation to the scanning angle.

The distance control unit 2 identifies a preceding vehicle to be recognized as an objective based on the preceding vehicle information received from the laser radar 3. The distance control unit 2 sends various control commands to the engine control unit 6 for adequately adjusting the distance or space between the system's vehicle and the preceding vehicle. The control commands, generated from the distance control unit 2, comprise a target acceleration signal, a fuel cut request signal, an O/D cut request signal, a third-speed shift down request signal, and a brake request signal. Furthermore, the distance control unit 2 performs the judgement for issuing a warning. A warning request signal or a warning cancel signal is sent to the engine control unit 6. A diagnosis signal and a display signal are also sent from the distance control unit 2 to the engine control unit 6.

The brake control unit 4 is an electronic circuit including a microcomputer associated with a steering sensor 8 detecting a steering angle of the system's vehicle, a yaw rate sensor 10 detecting a yaw rate of the system's vehicle, and a wheel speed sensor 12 detecting a rotational speed of each wheel. The brake control unit 4 sends the obtained data, such as the steering angle and the yaw rate of the system's vehicle, to the distance control unit 2 via the engine control unit 6. The brake control unit 4 receives the control commands, such as the target acceleration signal and the brake request signal, from the distance control unit 2 via the engine control unit 6 to control a brake actuator 25. The brake actuator 25 performs the duty control for opening and closing the pressurizing and depressurizing control valves equipped in a hydraulic braking pressure control circuit. Furthermore, the brake control unit 4 further receives the warning request signal from the distance control unit 2 via the engine control unit 6. The brake control unit 4 actuates a warning buzzer 14 in response to the warning request signal.

The engine control unit 6 is an electronic circuit including a microcomputer associated with a throttle opening sensor 15 detecting a throttle opening degree (TOD) of the internal combustion engine, a vehicle speed sensor 16 detecting a present vehicle speed (Vn), a brake switch 18 detecting the depression of a braking pedal, a cruise control switch 20, and a cruise main switch 22. The engine control unit 6 further receives various detecting signals obtained from other sensors and switches. A body LAN 28 is connected to the engine control unit 6 to transmit a wiper switch signal and a tail switch signal to the engine control unit 6. The engine control unit 6 is connected to the brake control unit 4 to receive the steering angle (str-eng, S0) signal and the yaw rate signal. The engine control unit 6 is connected to the distance control unit 2 to receive the target acceleration signal, the fuel cut request signal, the O/D cut request signal, the third-speed shift down request signal, the brake request signal, the warning request signal, the diagnosis signal, and the display data signal.

The engine control unit 6 controls a throttle actuator 24 and a transmission actuator 26 in accordance with the received signals representing the driving conditions. The throttle actuator 24 adjusts the throttle opening degree (TOD) of the internal combustion engine to control the output power of the internal combustion engine. The transmission actuator 26 performs the gear shift change as well as the lock-up control of the torque converter.

The transmission (not shown) is a five-speed automatic transmission with a fourth-speed stage of a reduction ratio=1 and a fifth-speed stage of a reduction ratio=0.7, which is generally referred to as a "4 speeds+overdrive (O/D)" transmission. In this case, the reduction ratio is defined by a ratio of the rotational speed of the gear to the output speed of the engine.

Accordingly, when the engine control unit 6 receives the O/D cut request signal from the distance control unit 2, the transmission actuator 26 causes the transmission to shift down to the fourth-speed stage from the fifth-speed stage in response to this O/D cut request signal. When the engine control unit 6 receives the third-speed shift down request signal from the distance control unit 2, the transmission actuator 26 causes the transmission to shift down to the third-speed stage from the fourth-speed stage in response to this third-speed shift down signal. In general, the shift-down operation of the transmission causes a large engine brake force. The system's vehicle decelerates in accordance with the generated braking force.

The engine control unit 6 transmits display information to a display unit (not show), such as an LCD (i.e., liquid crystal display) located on an instrument panel or a dashboard in the passenger compartment, through the body LAN 28. Furthermore, the engine control unit 6 transmits the present vehicle speed (Vn) signal, the steering angle (str-eng, S0) signal, the yaw rate signal, the target distance (time) signal, the wiper switch signal, and various control condition signals, such as engine idling signal and braking signal, to the distance control unit 2.

Figure 2:
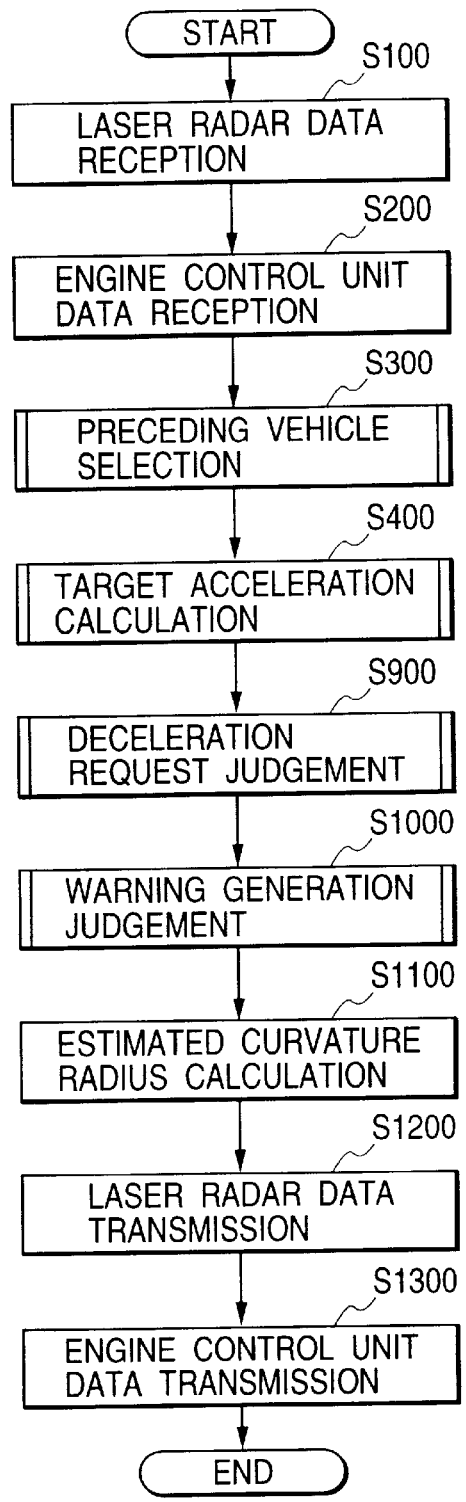
FIG. 2 is a flowchart showing main processing procedure performed for an inter-vehicle control in accordance with the preferred embodiment of the present invention.

FIG. 2 is a flowchart showing main processing procedure for an inter-vehicle control performed in the distance control unit 2 in accordance with the preferred embodiment of the present invention. First, in step S100, the distance control unit 2 receives the radar data from the laser radar 3. For example, preceding vehicle information is included in the received radar data. The processing procedure performed in the laser radar 3 will be explained later.

Next, in step S200, the distance control unit 2 receives engine control data from the engine control unit 6. The present vehicle speed (Vn) and the target distance (time) are included in the received engine control data. Based on the data thus received, the distance control unit 2 performs preceding vehicle selection (step S300), target acceleration calculation (step S400), deceleration request judgement (step S900), and warning generation judgement (step S1000). Details of each processing will be explained later. Then, the distance control unit 2 calculates the estimated curvature radius "R" (step S1100), and transmits the present vehicle speed (Vn) and the estimated curvature radius "R" to the laser radar 3 (step S1200). Furthermore, the distance control unit 2 transmits various data to the engine control unit 6, including the target acceleration, the fuel cut request, the O/D cut request, the third-speed shift down request, the brake request, the warning request, and the diagnosis (step S1300).

Figure 3:
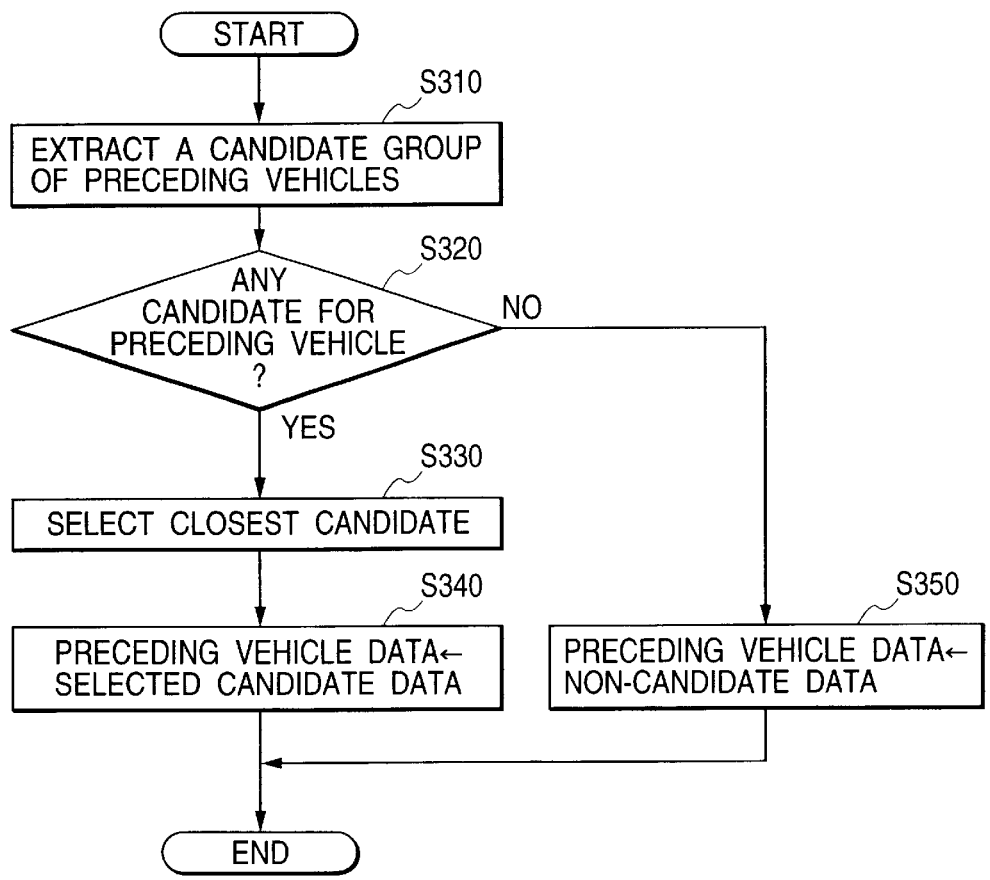
FIG. 3 is a flowchart showing details of a preceding vehicle selecting subroutine executed in the main processing procedure shown in FIG. 2.

Next, detailed processing in the steps S300, S400, S900 and S1000 will be explained successively. FIG. 3 is a flowchart showing details of step S300 which is a subroutine for selecting a preceding vehicle.

In step S310, a candidate group is extracted from all objectives recognized by the laser radar 3. The candidate group consists of all preceding vehicles traveling on the same traffic lane or zone of the traveling road, which are discriminable based on the same lane probability calculated by the laser radar 3. As described above, the laser radar 3 calculates the same lane probability (i.e., probability of both the preceding vehicle and the system's vehicle traveling on the same traffic lane or zone of the traveling road) based on the present vehicle speed (Vn) signal and the estimated curvature radius "R" of the traveling road. The calculated result is sent as the preceding vehicle information to the distance control unit 2. When a preceding vehicle has a same lane probability higher than a predetermined value, this preceding vehicle is identified as one of candidates.

In step S320, it is checked whether any candidate is recognized or not. When there is no candidate (NO in the step S320), the control flow proceeds to step S350 to memorize predetermined non-candidate data as preceding vehicle data. Then, this subroutine is completed.

When there is any candidate (YES in the step S320), the control flow proceeds to step S330 to select the closest candidate (i.e., closest preceding vehicle). The selected candidate (i.e., selected preceding vehicle) is identified as an objective for the distance control. Then, the control flow proceeds to the next step S340 to memorize the selected candidate data as the preceding vehicle data. Then, this subroutine is completed.

FIG. 4A is a flowchart showing the details of step S400 which is a subroutine for calculating the target acceleration (or deceleration).

In step S410, it is checked whether any preceding vehicle is memorized or not. When any preceding vehicle is memorized (YES in the step S410), the control flow proceeds to step S420 to calculate a distance deviation ratio (%). The distance deviation ratio is defined by $(\Delta d/dm) \times 100 = \{(d-dm)/dm\} \times 100$, when "d" represents an actual distance between the preceding vehicle and the system's vehicle and "dm" represents the target distance between the vehicles. It is preferable that the target distance "dm" is variable according to the vehicle speed so that the determined target value matches with driver's feeling. Next, in step S430, the relative speed is processed by a low pass filter.

Figure 5A:
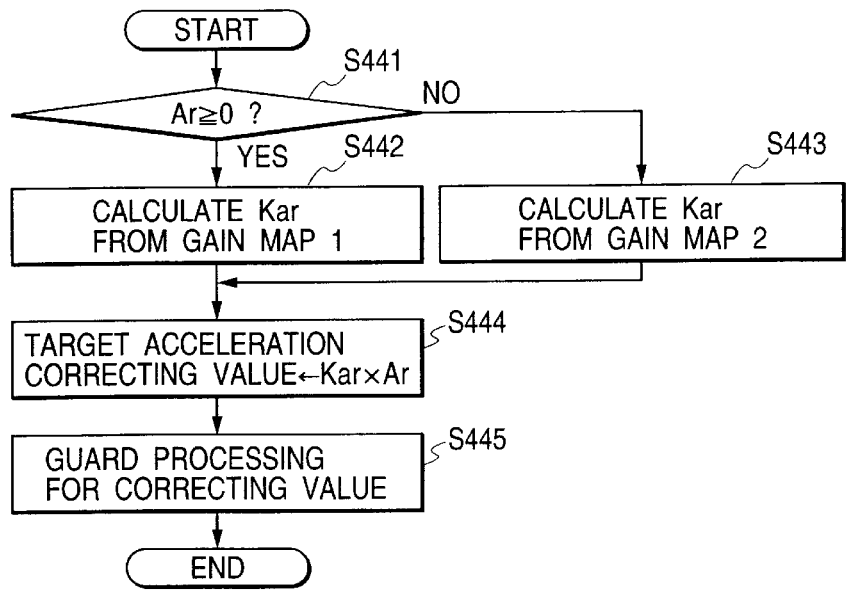
FIG. 5A is a flowchart showing details of calculation of a target acceleration correcting value executed in the target acceleration calculating subroutine shown in FIG. 4A.
Figure 5B:
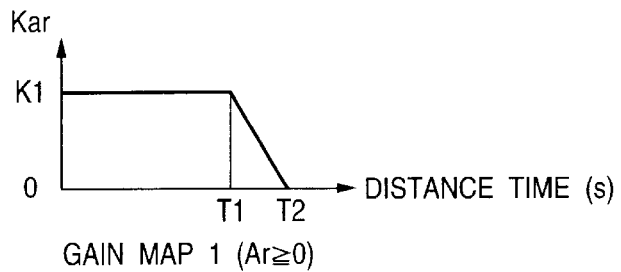
FIGS. 5B and 5C are graphs showing gain values applied to relative acceleration.
Figure 5C:
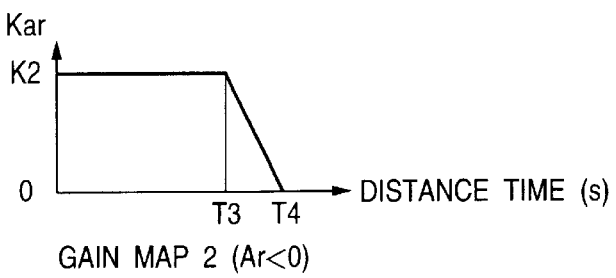

Next, in step S440, a target acceleration correcting value is calculated. FIGS. 5A to 5C show detailed calculation of the target acceleration correcting value.

In a first step S441, it is checked whether the relative acceleration is equal to or larger than 0, i.e., $Ar \geq 0$. When the relative acceleration is equal to or larger than 0 (i.e., YES in step S441), gain Kar is calculated based on a relative acceleration gain map 1 shown in FIG. 5B (step S442). When the relative acceleration is smaller than 0 (i.e., NO in step S441), gain Kar is calculated based on a relative acceleration gain map 2 shown in FIG. 5C (step S443).

The gain maps 1 and 2 shown in FIGS. 5B and 5C are determined in the following manner. The gain Kar is set as a value corresponding to the actual distance (time). According to the gain map 1 shown in FIG. 5B, the gain Kar is a constant value K1 in a first section from distance time 0 to T1 and linearly decreases K1 to 0 in a second section from distance time T1 to T2. On the other hand, according to the gain map 2 shown in FIG. 5C, the gain Kar is a constant value K2 in a first section from distance time 0 to T3 and linearly decreases from K2 to 0 in a second section from distance time T3 to T4. The constant value K2 is not smaller than the constant value K1 (i.e., $K2 \geq K1$). For example, practical values for the gain maps 1 and 2 are K1=0.2, T1=2, T2=3, K2=0.3, T3=2 and T4=3.

In the step S444 in FIG. 5A, the gain Kar obtained in the step S442 or S443 is multiplied with the relative acceleration to calculate a target acceleration correction value. In the next step S445, guard processing is applied to the target acceleration correction value so as to prevent an absolute value of the correction value from excessively increasing.

Returning to step S450 in FIG. 4A, a map value is obtained based on the distance deviation ratio obtained in step S420 and the relative speed obtained in step S430 with reference to the control map shown in FIG. 4B. Then, the map value is added to the target acceleration correcting value obtained in the step S440, thereby finally obtaining a target acceleration.

The control map of FIG. 4B shows a total of seven discrete reference values for the distance deviation ratio $(\Delta d/dm) \times 100$, i.e., −96, −64, −32, 0, 32, 64, 96(%), as well as a total of six discrete reference values for the relative speed Vr, i.e., 16, 8, 0, −8, −16, −24 (km/h). Map data are given in relation to these different discrete reference values. When the obtained distance deviation ratio $(\Delta d/dm) \times 100$ and/or the obtained relative speed Vr are somewhere between discrete reference values, the map data are linearly interpolated to obtain an appropriate control value. When the obtained distance deviation ratio $(\Delta d/dm) \times 100$ or the obtained relative speed Vr is large or small beyond the designated region of the control map shown in FIG. 4B, the control value is obtained based on the closest discrete reference value (i.e., a value located at the corresponding edge of the control map). It is possible to apply a predetermined upper and/or lower limit guard in the adoption of the map data.

When no preceding vehicle is memorized (NO in the step S410), the target acceleration is obtained considering no presence of any preceding vehicle in step S460. Then, this subroutine is completed.

Next, the deceleration request judging subroutine performed instep S900 will be explained with reference to the flowchart shown in FIG. 6.

The deceleration request judgement consists of a fuel cut request judgement (S910), an OD cut request judgement (S920), a third-speed shift down request judgement (S930), and a brake request judgement (S940) which are performed successively.

Figure 7:
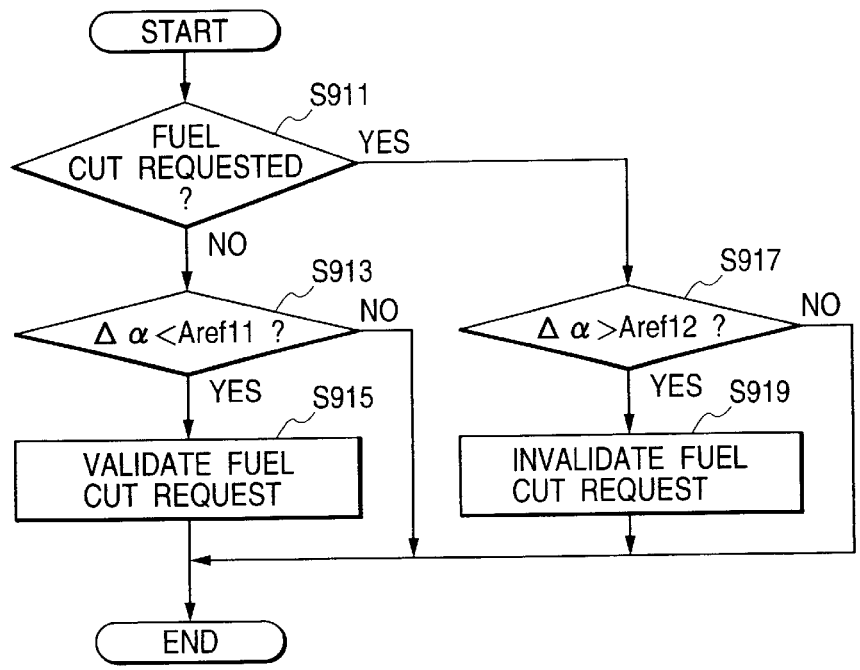
FIG. 7 is a flowchart showing details of fuel cut request judgement performed in the deceleration request judging subroutine shown in FIG. 6.

First, the fuel cut request judgement performed in step S910 will be explained with reference to the flowchart shown in FIG. 7.

More specifically, in step S911, it is checked whether the fuel cut operation is requested or not. If the fuel cut operation is not requested (i.e., NO in step S911), the control flow proceeds to step S913 to further check whether the acceleration deviation $\Delta\alpha$ is smaller than a first reference value Aref11 or not. When the judgement result is YES in the step S913 (i.e., $\Delta\alpha < \text{Aref11}$), the control flow proceeds to step S915 to validate the fuel cut request. Then, this subroutine is terminated. When the judgement result is NO in the step S913 (i.e., $\Delta\alpha \geq \text{Aref11}$), this subroutine is terminated.

On the other hand, when the fuel cut operation is requested (i.e., YES in step S911), the control flow proceeds to step S917 to further check whether the acceleration deviation $\Delta\alpha$ is larger than a second reference value Aref12 or not. The second reference value Aref12 is larger than the first reference value Aref11. When the judgement result is YES in the step S917 (i.e., $\Delta\alpha > \text{Aref12}$), the control flow proceeds to step S919 to invalidate the fuel cut request. Then, this subroutine is terminated. When the judgement result is NO in the step S917 (i.e., $\Delta\alpha \leq \text{Aref12}$), this subroutine is terminated.

Figure 8:
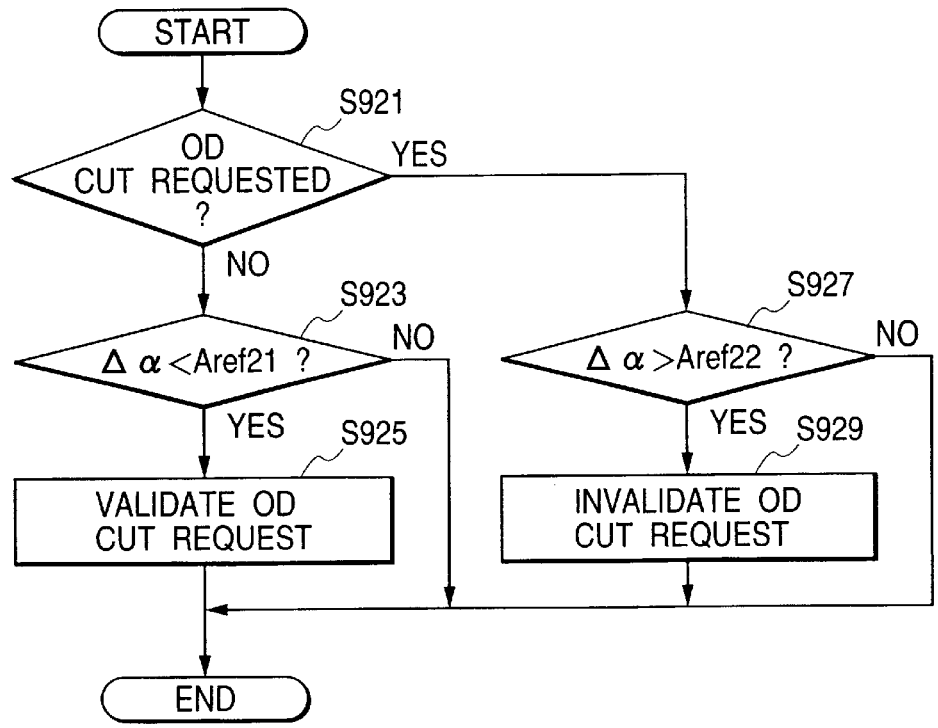
FIG. 8 is a flowchart showing details of OD (i.e., overdrive) cut request judgement performed in the deceleration request judging subroutine shown in FIG. 6.

Next, the OD cut request judgement performed in step S920 will be explained with reference to the flowchart shown in FIG. 8.

More specifically, in step S921, it is checked whether the OD cut operation is requested or not. If the OD operation is not requested (i.e., NO in step S921), the control flow proceeds to step S923 to further check whether the acceleration deviation $\Delta\alpha$ is smaller than a third reference value Aref21 or not. When the judgement result is YES in the step S923 (i.e., $\Delta\alpha < \text{Aref21}$), the control flow proceeds to step S925 to validate the OD cut request. Then, this subroutine is terminated. When the judgement result is NO in the step S923 (i.e., $\Delta\alpha \geq \text{Aref21}$), this subroutine is terminated.

On the other hand, when the OD operation is requested (i.e., YES in step S921), the control flow proceeds to step S927 to further check whether the acceleration deviation $\Delta\alpha$ is larger than a fourth reference value Aref22 or not. The fourth reference value Aref22 is larger than the third reference value Aref21. When the judgement result is YES in the step S927 (i.e., $\Delta\alpha > \text{Aref22}$), the control flow proceeds to step S929 to invalidate the OD cut request. Then, this subroutine is terminated. When the judgement result is NO in the step S927 (i.e., $\Delta\alpha \leq \text{Aref22}$), this subroutine is terminated.

Next, the third-speed shift down request judgement performed in step S930 will be explained with reference to the flowchart shown in FIG. 9.

More specifically, in step S931, it is checked whether the third-speed shift down operation is requested or not. If the third-speed shift down operation is not requested (i.e., NO in step S931), the control flow proceeds to step S933 to further check whether the acceleration deviation $\Delta\alpha$ is smaller than a fifth reference value Aref31 or not. When the judgement result is YES in the step S933 (i.e., $\Delta\alpha < \text{Aref31}$), the control flow proceeds to step S935 to validate the third-speed shift down request. Then, this subroutine is terminated. When the judgement result is NO in the step S933 (i.e., $\Delta\alpha \geq \text{Aref31}$), this subroutine is terminated.

On the other hand, when the third-speed shift down operation is requested (i.e., YES in step S931), the control flow proceeds to step S937 to further check whether the acceleration deviation $\Delta\alpha$ is larger than a sixth reference value Aref32 or not. The sixth reference value Aref32 is larger than the fifth reference value Aref31. When the judgement result is YES in the step S937 (i.e., $\Delta\alpha > \text{Aref32}$), the control flow proceeds to step S939 to invalidate the third-speed shift down request. Then, this subroutine is terminated. When the judgement result is NO in the step S937 (i.e., $\Delta\alpha < \text{Aref32}$), this subroutine is terminated.

Next, the brake request judgement performed in step S940 will be explained with reference to the flowchart shown in FIG. 10.

More specifically, in step S941, it is checked whether the fuel cut operation is requested or not. If the fuel cut operation is not requested (i.e., NO in step S941), the control flow proceeds to step S951 to invalidate the brake request. Then, this subroutine is terminated. On the other hand, when the fuel cut operation is requested (i.e., YES in step S941), the control flow proceeds to step S943 to further check whether the braking operation is requested or not. If the braking operation is not requested (i.e., NO in step S943), the control flow proceeds to step S945 to further check whether the acceleration deviation $\Delta\alpha$ is smaller than a seventh reference value Aref41 or not. When the judgement result is YES in the step S945 (i.e., $\Delta\alpha < \text{Aref41}$), the control flow proceeds to step S947 to validate the brake request. Then, this subroutine is terminated. When the judgement result is NO in the step S945 (i.e., $\Delta\alpha \geq \text{Aref41}$), this subroutine is terminated.

On the other hand, when the braking operation is requested (i.e., YES in step S943), the control flow proceeds to step S949 to further check whether the acceleration deviation $\Delta\alpha$ is larger than an eighth reference value Aref42 or not. The eighth reference value Aref42 is larger than the seventh reference value Aref41. When the judgement result is YES in the step S949 (i.e., $\Delta\alpha > \text{Aref42}$), the control flow proceeds to step S951 to invalidate the brake request. Then, this subroutine is terminated. When the judgement result is NO in the step S949 (i.e., $\Delta\alpha < \text{Aref42}$), this subroutine is terminated.

In the above-described flowcharts shown in FIGS. 7 to 10, the reference values Aref11, Aref12, Aref21, Aref22, Aref31, Aref32 Aref41, and Aref42 are thresholds having the following meaning.

| Decelerating Means | Threshold for Instructing Operation | Threshold for Canceling Operation |
| --- | --- | --- |
| Fuel Cut Operation | Aref11 | Aref12 |
| OD Cut Operation | Aref21 | Aref22 |
| 3rd Shift Down Operation | Aref31 | Aref32 |
| Braking Operation | Aref41 | Aref42 |

The relationship in magnitude between the instructing and canceling thresholds is as follows.

| | |
| --- | --- |
| Fuel Cut Operation | Aref11 < Aref12 |
| OD Cut Operation | Aref21 < Aref22 |
| 3rd Shift Down Operation | Aref31 < Aref32 |
| Braking Operation | Aref41 < Aref42 |

The above-described relationship between the instructing and canceling thresholds used in each control is generally provided for suppressing the chattering phenomenon.

The relationship between respective instructing thresholds is as follow.

$$0 > \text{Aref11} \geq \text{Aref21} \geq \text{Aref31} \geq \text{Aref41}$$

This relationship is necessary to determine priority in operation (i.e., activation order) among a plurality of deceleration devices. According to this relationship, the deceleration device activated first is the fuel injection device which causes the smallest deceleration by stopping supply of fuel. The deceleration device activated next is the transmission (i.e., OD cut operation and third-speed shift down operation) which causes an intermediate or medium deceleration by prohibiting shifting to an upper-speed gear position or forcibly shifting down to a lower-speed gear position. The deceleration device activated last is the braking device which causes the largest deceleration by applying a braking force to each wheel.

The relationship between respective canceling thresholds is as follow.

$$\text{Aref12} \geq \text{Aref22} \geq \text{Aref32} \geq \text{Aref42} > 0$$

This relationship is necessary to determine the deactivation order among the plural deceleration devices. According to this relationship, the deceleration device deactivated first is the braking device which causes the largest deceleration. The deceleration device deactivated next is the transmission which causes the intermediate or medium deceleration. The deceleration device deactivated last is the fuel injection device which causes the smallest deceleration.

Figure 11A:
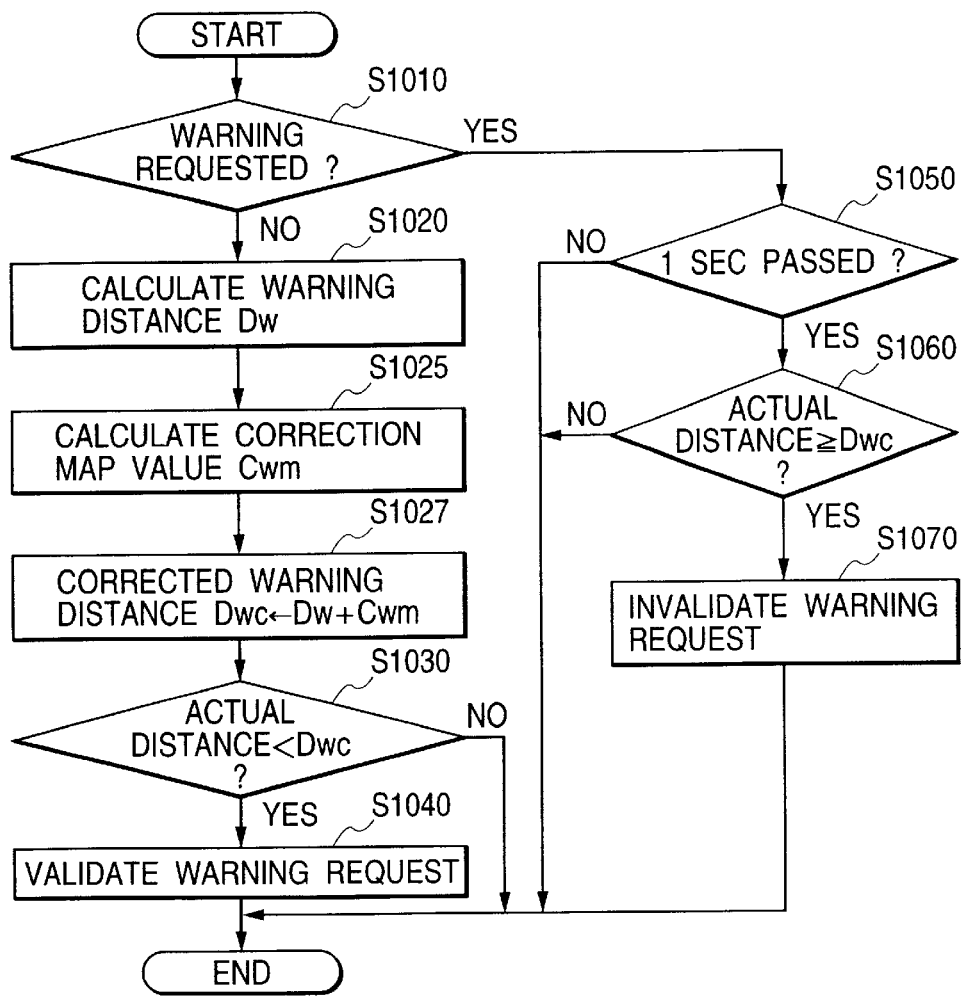
FIG. 11A is a flowchart showing details of warning generation judging subroutine executed in the main processing procedure shown in FIG. 2.

Next, the details of the warning generation judgement performed in step S1000 will be explained with reference to the flowchart shown in FIG. 11A.

More specifically, in step S1010, it is checked whether the warning operation is requested or not. If the warning operation is not requested (i.e., NO in step S1010), the control flow proceeds to step S1020 to check establishment of several conditions required for instructing the warning request (S1020, S1025, S1027, S1030, and S1040).

More specifically, in step S1020, a warning distance Dw is calculated based on the system's vehicle speed and the relative speed.

Warning distance Dw=f (System's vehicle speed, Relative speed)

Figure 11B:
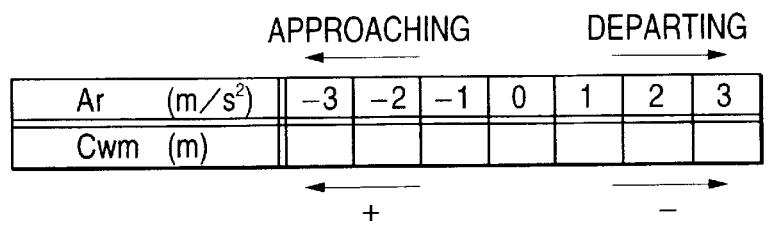
FIG. 11B is a warning distance correcting map used in the warning generation judging subroutine shown in FIG. 11A.

In the next step S1025, a map value Cwm is calculated based on a warning distance correction map shown in FIG. 11B. The warning distance correction map of FIG. 11B shows correction values (m) for a total of seven discrete relative acceleration value, i.e., −3, −2, −1, 0, 1, 2, 3 (m/s$^2$). When the obtained relative acceleration are somewhere between discrete reference values, the map data are linearly interpolated to obtain an appropriate control value. When the obtained relative acceleration is large or small beyond the designated region of the control map shown in FIG. 11B, the control value is obtained based on the closest correction value (i.e., a value located at the corresponding edge of the control map). It is possible to apply a predetermined upper and/or lower limit guard in the adoption of the map data.

In the next step S1027, the correction map value Cwm obtained in step S1025 is added to the warning distance Dw calculated in step S1020 to obtain a corrected warning distance Dwc; i.e., Dwc=Dw+Cwm.

In the next step S1030, it is checked whether the actual distance is smaller than the corrected warning distance Dwc or not. When the actual distance is not smaller than the corrected warning distance (i.e., NO in step S1030), this subroutine is terminated. When the actual distance is smaller than the corrected warning distance (i.e., YES in step S1030), the control flow proceeds to step S1040 to validate the warning request.

On the other hand, when the warning operation is requested (i.e., YES in step S1010), the control flow proceeds to step S1050 to check establishment of several conditions required for canceling the warning request (S1050, S1060, and S1070).

In step S1050, it is checked whether or not one second has passed after establishment of warning request. If one second has not passed yet (NO), this subroutine is terminated. In other words, the warning processing is continued for at least one second.

When one second has already passed after establishment of warning request (i.e., YES in step S1050), the control flow proceeds to step S1060 to check whether the actual distance is equal to or larger than the warning distance or not. When the actual distance is smaller than the warning distance (i.e., NO in step S1060), this subroutine is terminated. When the actual distance is equal to or larger than the warning distance (i.e., YES in step S1060), the control flow proceeds to step S1070 to invalidate the warning request.

Establishment of the warning request at step S1040 is transmitted to the engine control unit 6 in the step S1300 shown in FIG. 2. The engine control unit 6 instructs the brake control unit 4 to activate the warning buzzer 14. Cancellation of the warning request at step S1070 is also transmitted to the engine control unit 6 in the step S1300 shown in FIG. 2. The engine control unit 6 instructs the brake control unit 4 to deactivate the warning buzzer 14.

The processing performed in the laser radar 3 will be explained hereinafter.

Figure 12:
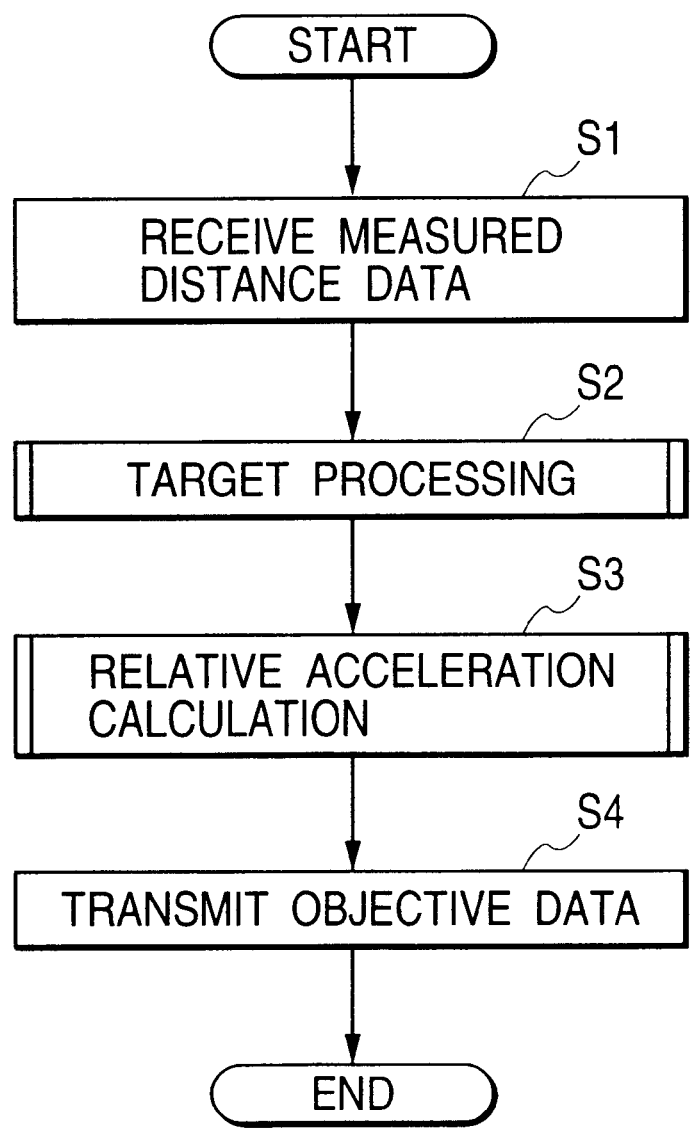
FIG. 12 is a flowchart showing details of recognition processing procedure performed in accordance with the predetermined embodiment of the present invention.

FIG. 12 is a flowchart showing the main processing performed at predetermined intervals in the laser radar 3.

First, in step S1, the laser radar 3 reads the measured distance data (i.e., distance and angle data) obtained by the distance measuring scanner equipped therein. Next, in step S2, the laser radar 3 performs the target processing of individual vehicles as an objective to be recognized. Then, in step S3, the laser radar 3 calculates a relative acceleration of the recognized target. Then, in step S4, the laser radar 3 transmits the target data (i.e., objective data) to the distance control unit 2. Then, the main processing is terminated.

The target processing performed in the step S2 will be explained with reference to the flowchart of FIG. 13. Regarding the target processing, the application has already proposed the similar processing in the U.S. Pat. No. 5,574,463.

Figure 13:
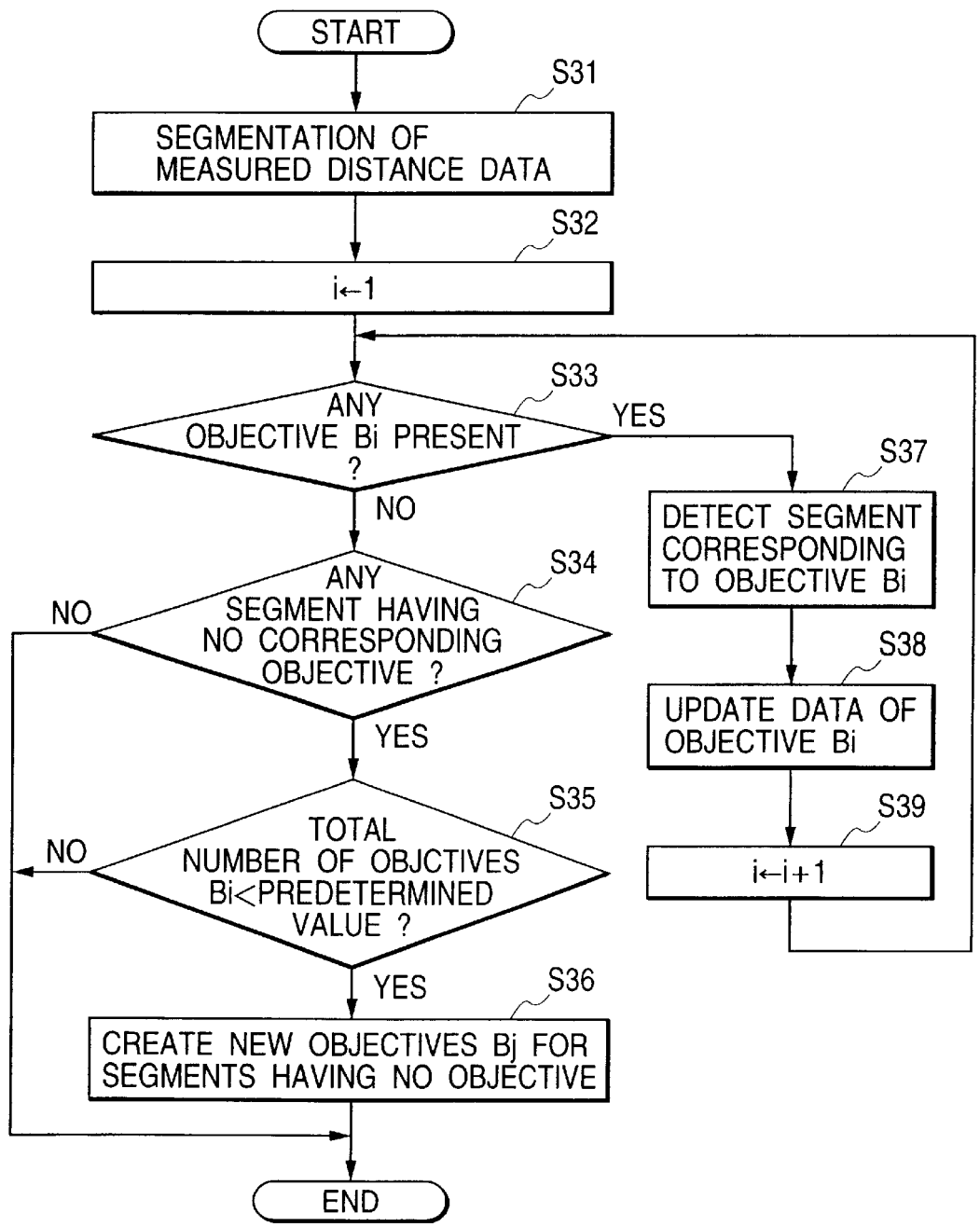
FIG. 13 is a flowchart showing details of target processing subroutine performed in the recognition processing procedure shown in FIG. 12.

As shown in FIG. 13, in step S31, an obstacle is recognized as discontinuous points based on measured distance data. Of all of the detected discontinuous points, adjacent ones are integrated as belonging to the same group and recognized as a line segment extending in lateral direction of each vehicle. In this case, any two points are recognized as "adjacent" when the following criteria are satisfied:

(I) In the X-axis direction, i.e., in the lateral direction of the vehicle, the distance between two points is equal to or smaller than an irradiation interval of the laser beam H.

(II) In the Y-axis direction, i.e., in the back-and-forth direction of the vehicle, the distance between two points is smaller than 3.0 m.

Segmentation is the processing for extracting one segment consisting of a group of points which cooperatively represent one object when this group of points satisfy predetermined conditions. The data belonging to the same group are summarized as a single segment based on the fact that, when a preceding vehicle (its body or reflection plates provided at right and left tail lamps) is scanned by the laser radar, a plurality of scanning data are usually obtained in relation to the plurality of scanning angles.

After finishing the segmentation of step S31, the control flow proceeds to step S32 to substitute 1 for the variable "i" (i=integer). Next, in step S33, it is checked whether an objective (i.e., recognized preceding vehicle) Bi is present or not. In other words, the objective Bi is a vehicle model created based on the segment. For example, no objective Bi may be present in an engine startup condition. When the objective Bi is not present (i.e., NO in step S33), the control flow proceeds to step S34.

It is then checked in step S34 whether there is any segment having no corresponding objective Bi. For example, no objective Bi will exist in the engine startup condition. Thus, if any segments are recognized in step S31, all of the recognized segments have no corresponding objective Bi. The judgement becomes YES in the step S34.

The control flow proceeds to step S35 to further check whether the total number of objectives Bi is smaller than a predetermined number. The predetermined number, referred to in the comparison of step S35, is equivalent to a sum of an upper limit of the vehicle numbers appearing in a predetermined scanning angle of the laser beam H and a predetermined margin. When the total number of objectives Bi is smaller than the predetermined number (i.e., YES in step S35), the control flow proceeds to step S36.

In step S36, new objectives Bj (j=1, 2, - - - -) are created for the segments having no objectives. In this case, assignment of the objective Bj to each segment is carried out in order of closeness between the segment and the system's vehicle. Then, this subroutine is terminated. When the total number reaches the predetermined number, no further objective Bj is created.

The data relating to the newly created objective Bj include a central coordinate (X, Y), a width W, a relative speed (Vx, Vy), past four coordinate values representing the central coordinate (X, Y), and a state flag Fj. Following is initial setting of respective data in the creation of objective Bj. The central coordinate (X, Y) and the width W are respectively equal to a central coordinate and a width of the segment. Vx=0, and Vy=−0.5×(vehicle speed). The past four coordinate values are empty, and Fj=0. The state flag Fj represents the state of objective Bj which is selected from the group of undetermined state, recognized condition, and extrapolated state. The state flag value corresponding to the undetermined state is 0 (i.e., Fj=0). In the creation of the objective Bj, the state flag Fj is set to the undetermined state.

When any objective Bi is present (i.e., YES in step S33), the control flow proceeds to step S37 to detect the segment corresponding to the objective Bi as described in greater detail in the U.S. Pat. No. 5,574,463.

After finishing the step S37, the control flow proceeds to step S38 to update the data of the objective Bi as described in greater detail in the U.S. Pat. No. 5,574,463. Then, the variable "i" is incremented (i.e., i←i+1) in the next step S39.

Through the above-described processing, it becomes possible to properly judge whether an obstacle recognized as a segment is identical with the past recognized objective Bi or not. Accordingly, the relative speed (Vx, Vy) of the objective Bi relative to the system's vehicle can be accurately calculated.

Next, the relative acceleration calculating processing performed in step S3 of FIG. 12 will be explained with reference to the flowcharts shown in FIGS. 14 to 22.

Figure 14:
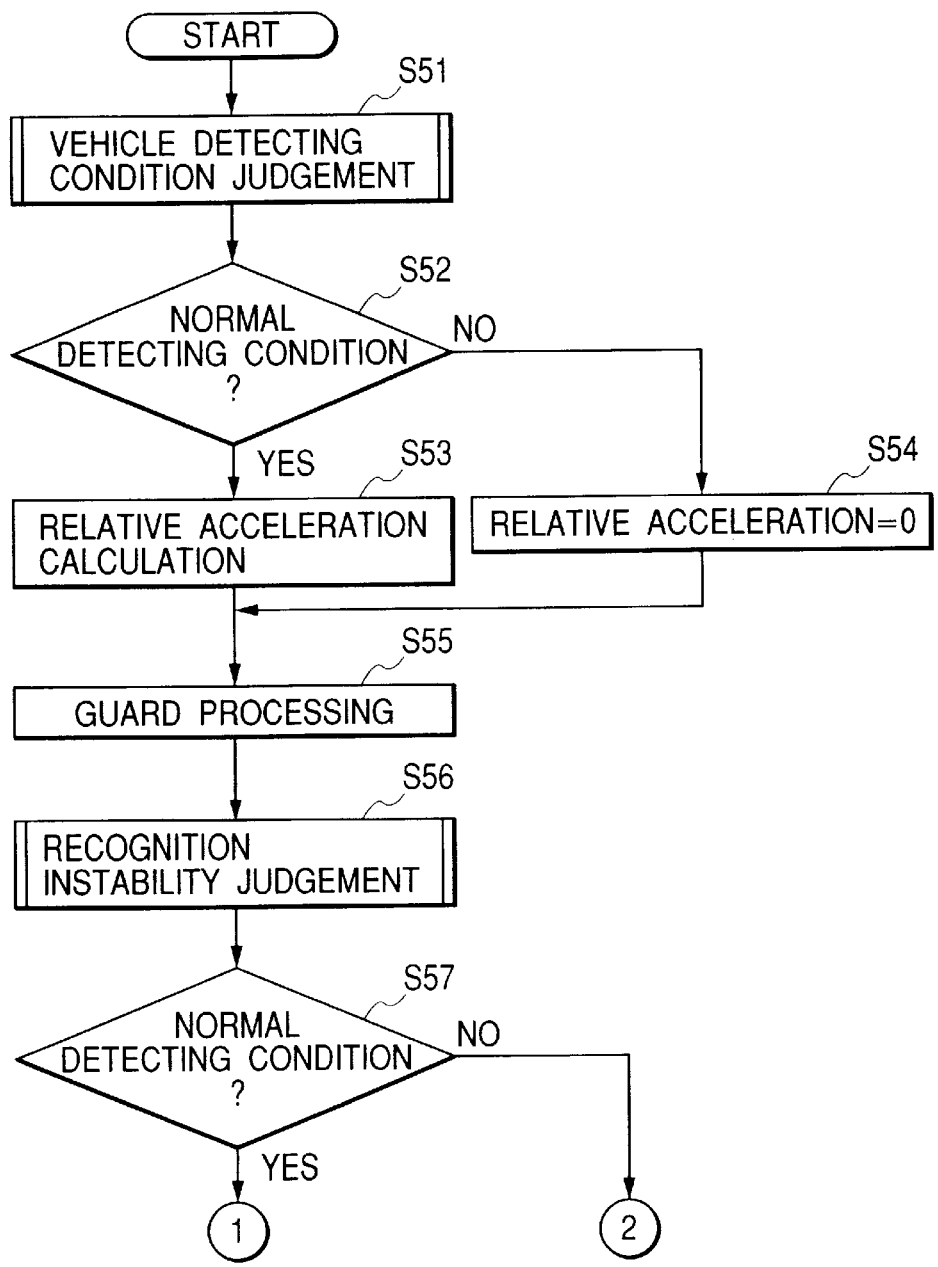
FIG. 14 is a flowchart (first half) showing details of relative acceleration calculating subroutine performed in the target processing procedure shown in FIG. 12.
Figure 15:
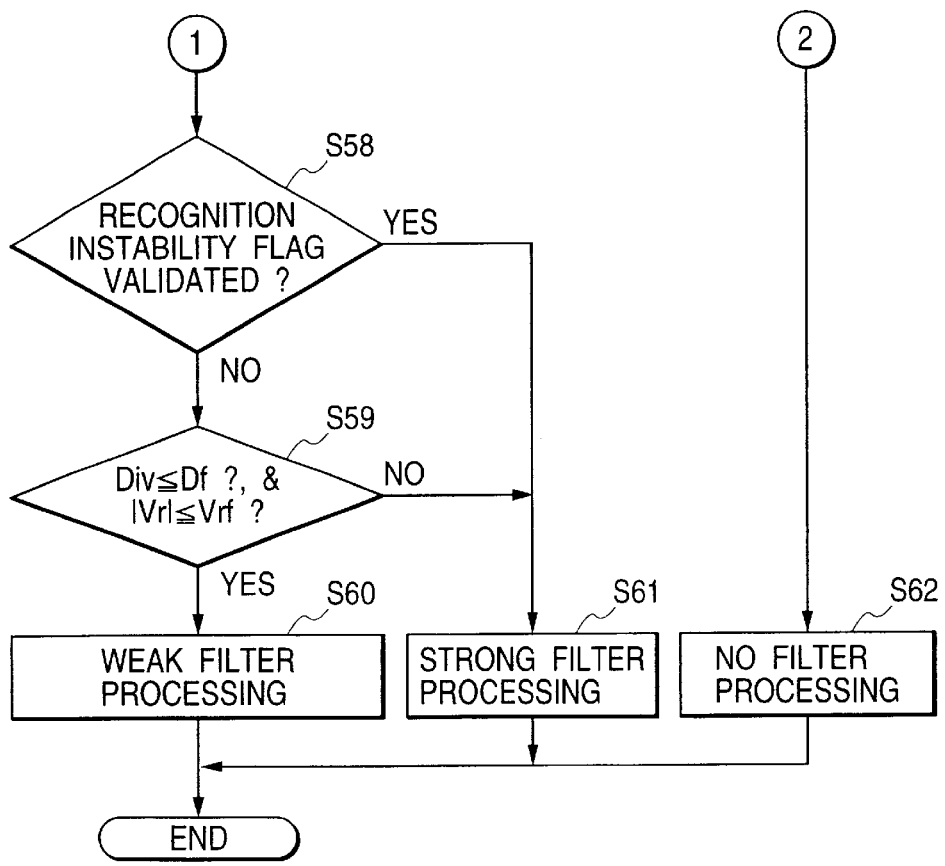
FIG. 15 is a flowchart (second half) showing details of relative acceleration calculating subroutine performed in the target processing procedure shown in FIG. 12.

FIGS. 14 and 15 are general flowcharts showing the relative acceleration calculating processing which is performed for all of the objectives.

First, in step S51, the vehicle detecting condition is judged. Details of the judgement will be explained later. In step S52, it is checked whether the vehicle detecting condition is normal or not. If the vehicle detecting condition is normal (i.e., YES in step S52), the control flow proceeds to step S53 to calculate the relative acceleration according to the following formula.

Relative Acceleration (m/s$^2$)={relative speed (present value)−relative speed (previous value)}(m/s)/distance measuring period (s)

When the vehicle detecting condition is not normal (i.e., NO in step S52), the control flow proceeds to step S54 to set the relative acceleration to 0.

After finishing the step S53 or S54, the control flow proceeds to step S55 to apply guard processing to the obtained relative acceleration. Thereafter, in step S56, recognition instability is judged. The judgement result of vehicle detecting condition obtained in step S51 and the judgement result of recognition instability obtained in step S56 are used in succeeding steps S57 to S62. The judgement result of recognition instability is expressed by validation/invalidation of a recognition instability flag, although details of the recognition instability judgement will be explained later.

In step S57, it is checked whether the vehicle detecting condition is normal or not based on the judgement result of step S51. If the vehicle detecting condition is normal (i.e., YES in step S57), the control flow proceeds to step S58 to further check whether the recognition instability flag is validated or not based on the judgement result of step S56. If the recognition instability flag is invalidated (i.e., NO in step S58), the control flow proceeds to step S59 to further check whether the system's vehicle is in a "chase traveling condition" or not. In this case, the "chase traveling condition" means that the system's vehicle requires quick accelerative response to chase the preceding vehicle. To this end, establishment of the following conditions is checked in step S59.

$Div \leq Df$ $|Vr| \leq Vref$ where Div represents a distance between the system's vehicle and the preceding vehicle, Df represents a predetermined reference value, |Vr| represents the absolute value of relative speed, and Vref represents a predetermined reference value.

When the system's vehicle is in the chase traveling condition (i.e., YES in step 59), the control flow proceeds to step S60 to apply filter processing to the relative acceleration with a weak filtering factor. On the other hand, when the system's vehicle is not in the chase traveling condition (i.e., NO in step 59) or when the recognition instability flag is validated (i.e., YES in step S58), the control flow proceeds to step S61 to apply filter processing to the relative acceleration with a strong filtering factor.

As understood from the flowchart of FIGS. 14 and 15, the filter processing (i.e., steps S60 and S61) is performed only when the vehicle detecting condition is normal (i.e., YES in step S57). When the vehicle detecting condition is not normal (i.e., NO in step S57), the control flow proceeds to step S62 to perform no filter processing. In this case, the relative acceleration being set to 0 in the step S54 is directly adopted.

Figure 24:
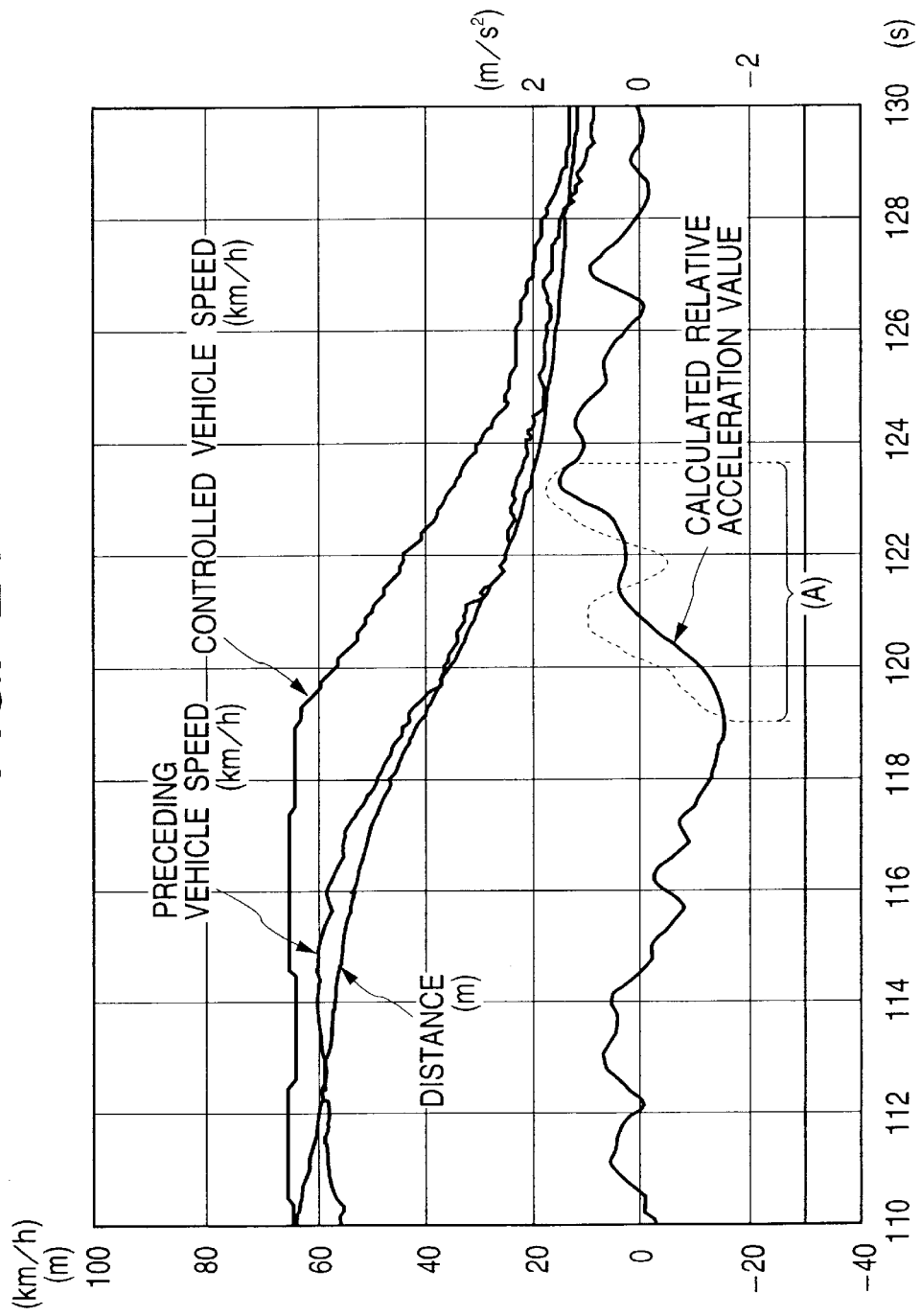
FIG. 24 is a time chart showing calculation result of relative acceleration.

FIG. 24 shows a time chart showing calculation result of the relative acceleration. In FIG. 24, a region (A) indicates a region being applied the filter processing. In the region (A), a solid line indicates the relative acceleration obtained by applying the filter processing with a strong filtering factor. A dotted line indicates the relative acceleration obtained by applying the filter processing with a weak filtering factor. As understood from FIG. 24, using a strong filtering factor is effective to eliminate adverse influence of noise. In general, using a strong filtering factor dulls the change of signal. Thus, it is preferable to use the strong filtering factor for the region (A) when the region (A) does not require sharp response. On the contrary, a weak filtering factor is used for the region prior to the region (A) because it is necessary to sensitively detect deceleration of a preceding vehicle.

Figure 25:
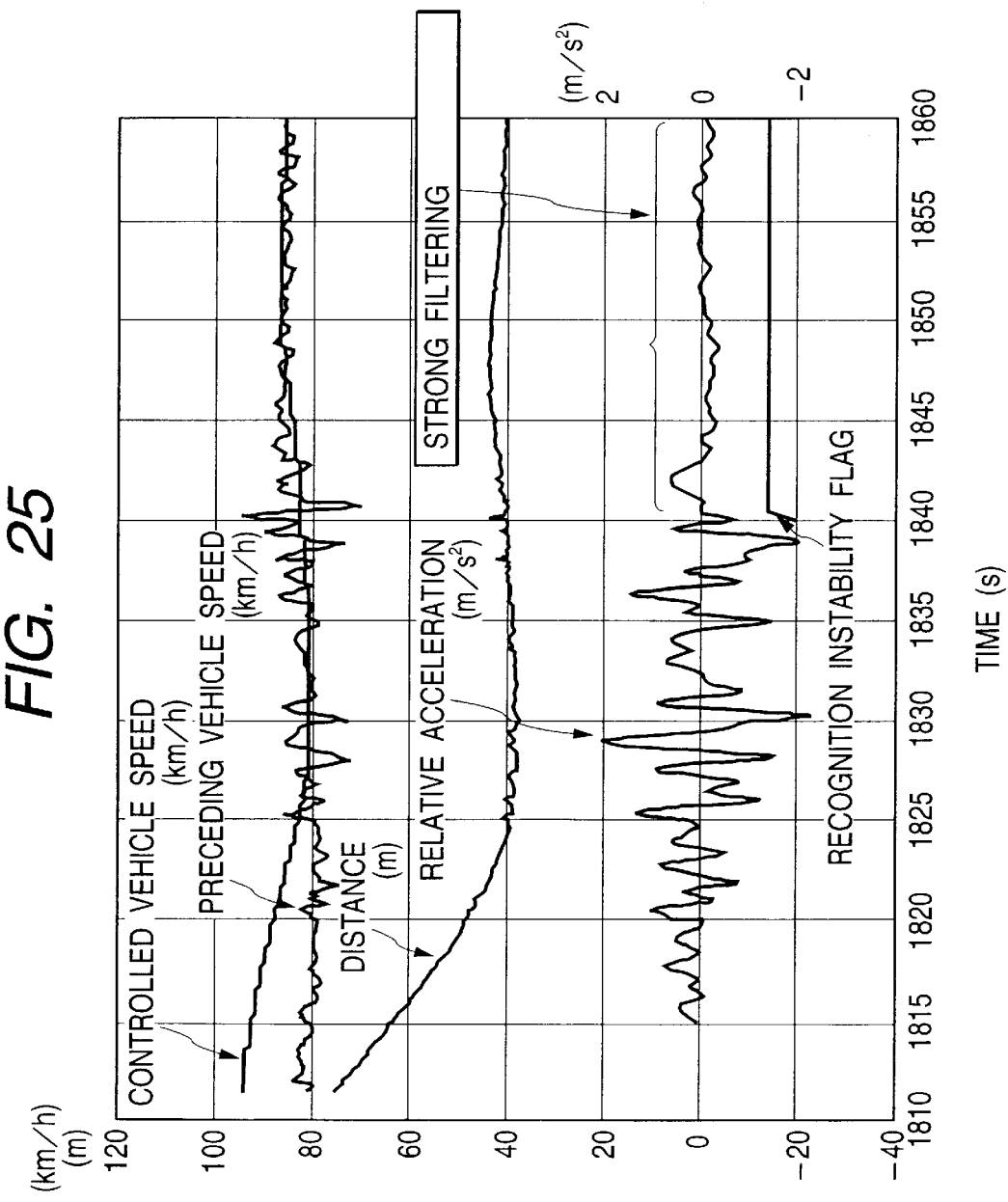
FIG. 25 is a time chart showing calculation result of the relative acceleration with respect to a recognition instability objective.

FIG. 25 shows a time chart showing calculation result of the relative acceleration with respect to the recognition unstable objective. The recognition instability flag is validated in the vicinity of time 1840 (s) upon establishment of later-described conditions. Prior to validation of the recognition instability flag, the filter processing is performed by using a weak filtering factor. After the recognition instability flag is validated, the filter processing using a strong filtering factor is applied to the relative acceleration. Accordingly, when the objective is unstable in recognized condition, it is subjected to the filter processing using a strong filtering factor so as to eliminate adverse influence of noise.

Next, the vehicle detecting condition judging processing performed in step S51 of FIG. 14 will be explained hereinafter.

Figure 16:
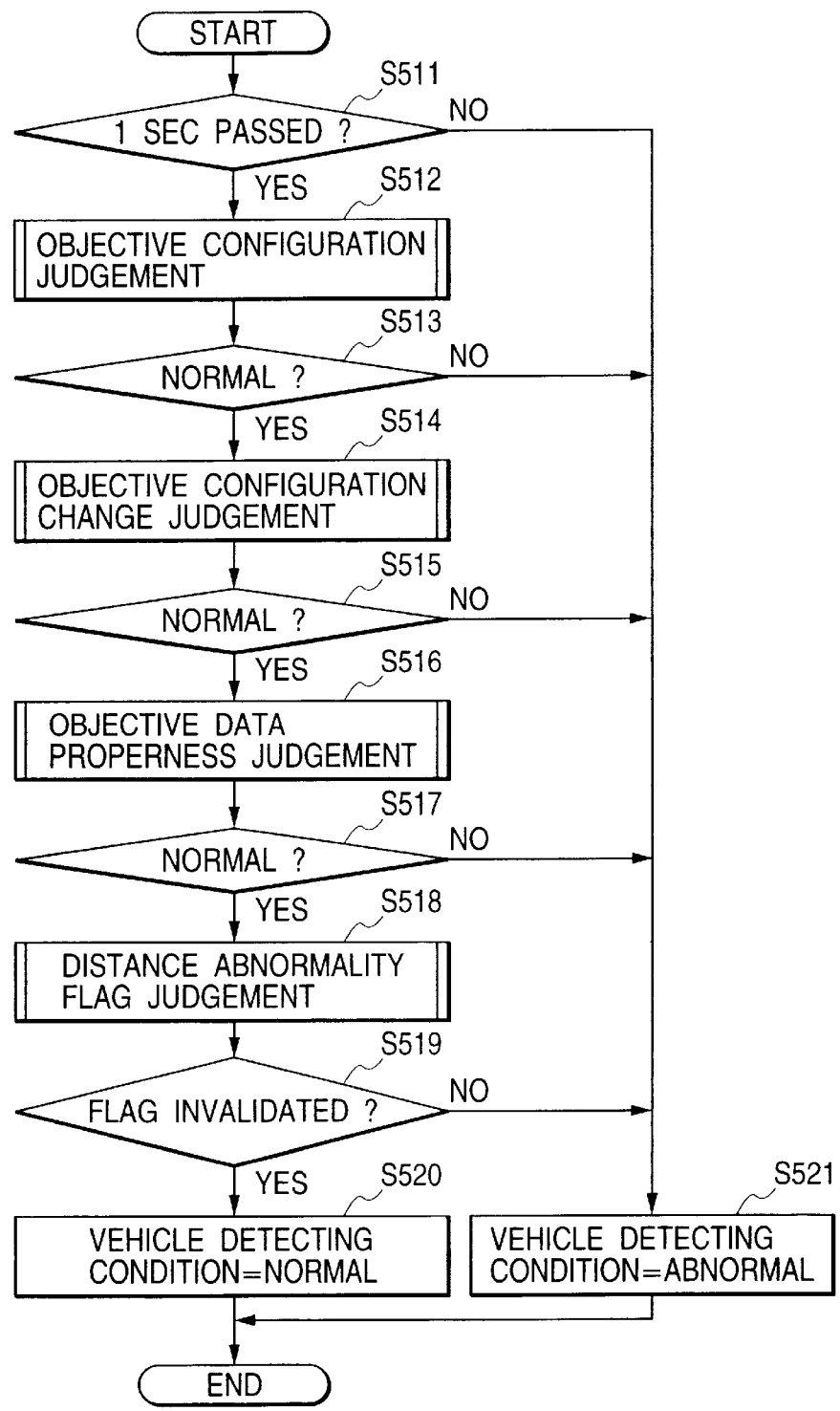
FIG. 16 is a flowchart showing details of vehicle detecting condition judgement performed in the relative acceleration calculating subroutine shown in FIG. 14.

FIG. 16 is a flowchart showing various judgements used for identifying vehicle detecting condition. FIGS. 17 to 20 are subroutines showing details of respective judgments performed in the main routine shown in FIG. 16.

In the first step S511 of FIG. 16, it is checked whether or not one second has passed after discovery of a preceding vehicle. If one second has not passed yet (i.e., NO in step S511), the control flow proceeds to step S521 to forcibly identify the vehicle detecting condition as being abnormal in this case from the reason that detection of an objective recognized within a short time is unstable. The relative acceleration calculated based on such unstable object should not be used for correcting the relative acceleration.

On the other hand, when one second has already passed (i.e., YES in step S511), the control flow proceeds to steps S512 to S519 to successively check whether all of the conditions in respective judgements are satisfied or not. If all of the conditions in respective judgements are satisfied, the control flow proceeds to step S520 to identify the vehicle detecting condition as being normal. However, when any one of the conditions in respective judgements is not satisfied, the control flow proceeds to step S521 to identify the vehicle detecting condition as being abnormal.

Figure 17:
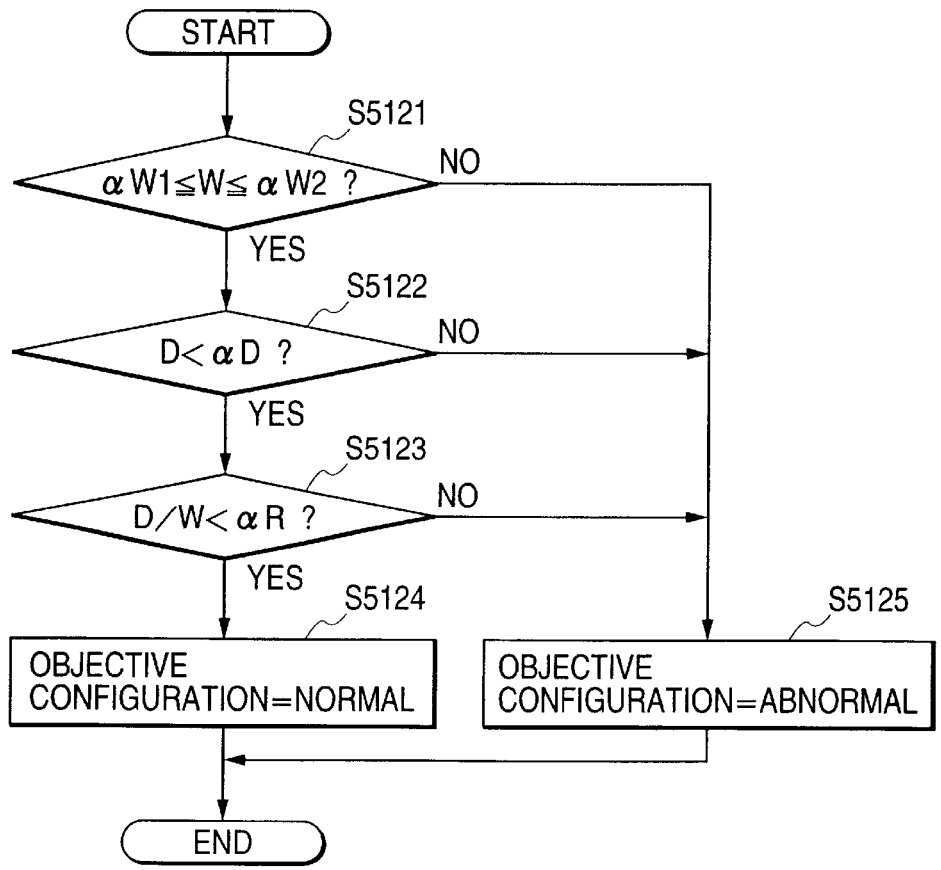
FIG. 17 is a flowchart showing details of objective configuration judgement performed in the vehicle detecting condition judgement subroutine shown in FIG. 16.

More specifically, configuration of an objective is judged in step S512. FIG. 17 shows details of the objective configuration judgement performed in step S512.

In the first step S5121 of FIG. 17, it is checked whether or not a lateral width W of the objective is not smaller than a predetermined value $\alpha W1$ and is not larger than a predetermined value $\alpha W2$ (i.e. $\alpha W1 \leq w \leq \alpha W2$?). When the condition $\alpha W1 \leq W \leq \alpha W2$ is satisfied (i.e., YES in step S5121), the control flow proceeds to step S5122 to further check whether or not a depth (or longitudinal size) D of the objective is smaller than a predetermined value $\alpha D$ (i.e., $D<\alpha D$?). When the condition $D<\alpha D$ is satisfied (i.e., YES in step S5122), the control flow proceeds to step S5123 to further check whether or not an aspect ratio D/W is smaller than a predetermined value $\alpha R$ (i.e., $D/W<\alpha R$?). The reference values $\alpha W1$, $\alpha W2$, $\alpha D$, and $\alpha R$ used in respective steps S5121 to S5123 are determined considering actual size of ordinary vehicles. If all of the conditions in respective judgements are satisfied in steps S5121 through S5123, the control flow proceeds to step S5124 to identify the objective as having normal configuration. However, when any one of the conditions in respective judgements performed in steps S5121 through S5123 is not satisfied, the control flow proceeds to step S5125 to identify the objective as having abnormal configuration.

Returning to the explanation of FIG. 16, it is checked in step S513 whether the objective configuration is normal or not based on the judgement result obtained in step S512. If the objective configuration is abnormal (i.e., NO in step S513), the control flow proceeds to step S521 to identify the vehicle detecting condition as being abnormal. When the objective configuration is normal (i.e., YES in step S513), the control flow proceeds to step S514.

Figure 18:
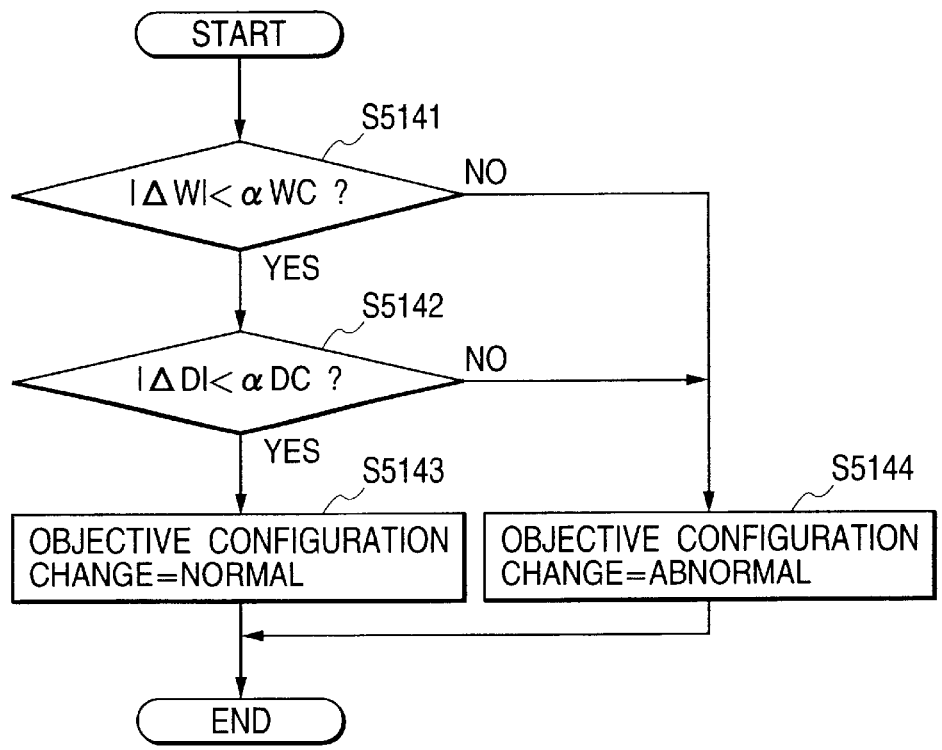
FIG. 18 is a flowchart showing details of objective configuration change judgement performed in the vehicle detecting condition judgement subroutine shown in FIG. 16.

In step S514, change of objective configuration is judged. FIG. 18 shows details of the objective configuration change judgement performed in step S514.

In the first step S5141 of FIG. 18, it is checked whether or not the absolute value of objective lateral width change (i.e., absolute change of lateral width of the objective) $|\Delta W|$ is smaller than a predetermined value $\alpha WC$ (i.e. $|\Delta W|<\alpha WC$?). In this case, $\Delta W$=objective lateral width W (present value)−objective lateral width W (previous value). When the condition $|\Delta W|<\alpha WC$ is satisfied (i.e., YES in step S5141), the control flow proceeds to step S5142 to further check whether or not the absolute value of objective depth change (i.e., absolute change of depth of the objective) $|\Delta D|$ is smaller than a predetermined value $\alpha DC$ ($|\Delta D|<\alpha DC$?). In this case, $\Delta D$=objective depth (present value)−objective depth (previous value). The reference values $\alpha WC$ and $\alpha DC$ used in respective steps S5141 to S5142 are determined considering actual change in the size of ordinary vehicles. If both of the conditions in respective judgements are satisfied in steps S5141 through S5142, the control flow proceeds to step S5143 to identify the change of objective as being normal. However, when any one of the conditions in respective judgements performed in steps S5141 and S5142 is not satisfied, the control flow proceeds to step S5144 to identify the change of objective as being abnormal.

Returning to the explanation of FIG. 16, it is checked in step S515 whether the objective configuration change is normal or not based on the judgement result obtained in step S514. If the objective configuration change is abnormal (i.e., NO in step S515), the control flow proceeds to step S521 to identify the vehicle detecting condition as being abnormal. When the objective configuration change is normal (i.e., YES in step S515), the control flow proceeds to step S516.

Figure 19:
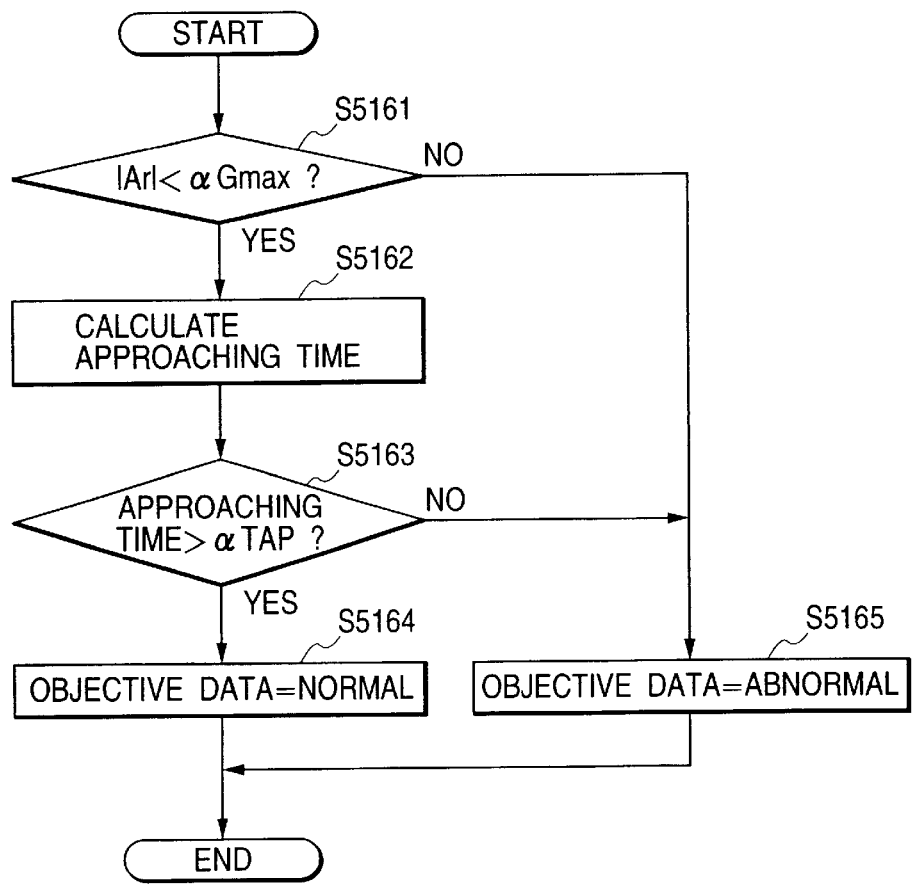
FIG. 19 is a flowchart showing details of objective data properness judgement performed in the vehicle detecting condition judgement subroutine shown in FIG. 16.

In step S516, properness of objective data is judged. FIG. 19 shows details of the objective data properness judgement performed in step S516.

In the first step S5161 of FIG. 19, it is checked whether or not the absolute value of the relative acceleration Ar is smaller than a predetermined value $\alpha Gmax$ (i.e., $|Ar|<\alpha Gmax$?). If the condition $|Ar|<\alpha Gmax$ is satisfied (i.e., YES in step S5161), the control flow proceeds to step S5162 to calculate an approaching time Tap. When the relative speed Vr is a negative value, the approaching time Tap is obtained by dividing the inter-vehicle distance by the relative speed Vr. When the relative speed Vr is not a negative value, the approaching time Tap is infinite ($\infty$). In the next step S5163, it is checked whether or not the approaching time Tap is larger than a predetermined value $\alpha TAP$ (i.e., $Tap>\alpha TAP$?). If the condition $Tap>\alpha TAP$ is satisfied (i.e., YES in step S5163), the control flow proceeds to step S5164 to identify the objective data as being normal. When the condition $Tap>\alpha TAP$ is not satisfied (i.e., NO in step S5163), the control flow proceeds to step S5165 to identity the objective data as being abnormal.

The predetermined value $\alpha TAP$ should be set to an appropriate value so that ordinary vehicles cannot have an approaching time smaller than $\alpha TAP$ under traffic environment of ordinary distance control. For example, an appropriate value for $\alpha TAP$ is 2 seconds. If the distance control is properly performed, the system's vehicle will not collide with a preceding vehicle within a short period of time equal to or less than 2 seconds. Hence, the objective data having an excessively short approaching time is believed to be abnormal.

Meanwhile, when the condition $|Ar|<\alpha Gmax$ is not satisfied (NO in step S5161), the control flow proceeds to step S5165 to identify the objective data as being abnormal.

Returning to the explanation of FIG. 16, it is checked in step S517 whether the objective data is normal or not based on the judgement result obtained in step S516. If the objective data is abnormal (i.e., NO in step S517), the control flow proceeds to step S521 to identify the vehicle detecting condition as being abnormal. When the objective data is normal (i.e., YES in step S517), the control flow proceeds to step S518 to perform distance abnormality flag judgement.

Figure 20:
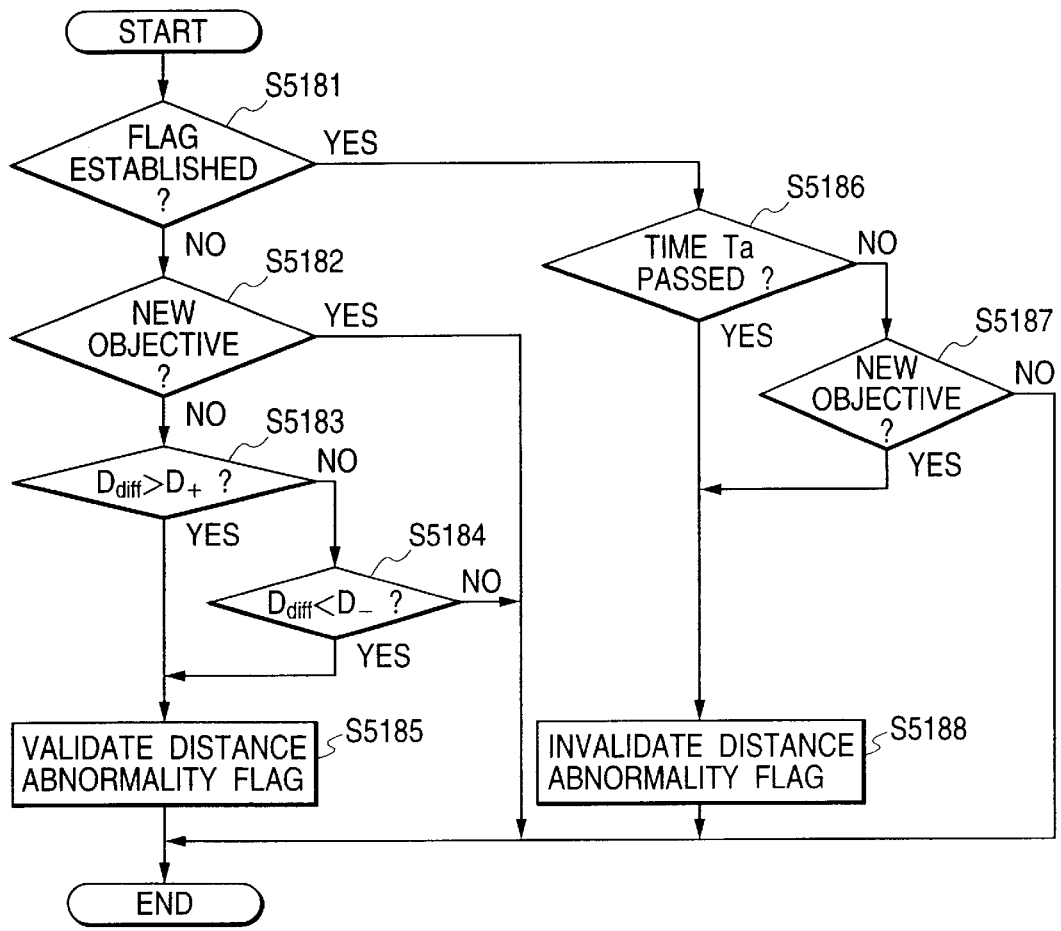
FIG. 20 is a flowchart showing details of distance abnormality flag judgement performed in the vehicle detecting condition judgement subroutine shown in FIG. 16.

FIG. 20 shows details of the distance abnormality flag judgement performed in step S518.

In the first step S5181 of FIG. 20, it is checked whether a distance abnormality flag is established or not. If the distance abnormality flag is not established (i.e., NO in step S5181), the control flow proceeds to step S5182 to further check whether the objective is a new one or not (i.e., whether the objective is newly detected in the present measuring cycle or continuously detected since previous measuring cycle). The target processing subroutine shown in FIG. 13 provides information necessary to judge whether the objective is new or not.

If the objective is a new one (YES in step S5182), this subroutine is terminated. On the other hand, when the objective is not a new one (NO in step S5182), the control flow proceeds to step S5183 to further check whether a distance change amount Ddiff is larger than a predetermined upper limit $D_+$ (i.e., Ddiff>$D_+$?). If the condition Ddiff>$D_+$ is satisfied (i.e., YES in step S5183), the control flow proceeds to step S5185 to validate the distance abnormality flag. Then, this subroutine is terminated. On the other hand, when the condition Ddiff>$D_+$ is not satisfied (i.e., NO in step S5183), the control flow proceeds to step S5184 to further check whether the distance change amount Ddiff is smaller than a predetermined lower limit $D_-$ (i.e., Ddiff<$D_-$?). If the condition Ddiff<$D_-$ is satisfied (i.e., YES in step S5184), the control flow proceeds to step S5185 to validate the distance abnormality flag. Then, this subroutine is terminated. On the other hand, when the condition Ddiff<$D_-$ is not satisfied (i.e., NO in step S5184), this subroutine is terminated.

Hereinafter, the distance change amount Ddiff and the upper and lower limits $D_+$ and $D_-$ will be explained in more detail.

The distance change amount Ddiff is equal to a change of inter-vehicle distance from a previous distance D(n−1) to a present distance D(n), i.e., Ddiff=D(n)−D(n−1).

The upper and lower limits $D_+$ and $D_-$ are defined by the following formulas.

$$D_+ = Vr(n-1)/3.6 \times T_{LR} + G_+ \times (T_{LR}^2/2) + \epsilon$$

$$D_- = Vr(n-1)/3.6 \times T_{LR} - G_- \times (T_{LR}^2/2) - \epsilon$$

where Vr(n−1) represents a previous relative speed (km/h) obtained one control period of time ago, $T_{LR}$ represents a distance measuring period of the laser radar (sec), $\epsilon$ represents a distance measuring error or tolerance of measured distance (m), $G_+$ represents a producible maximum relative acceleration (positive side) (m/s$^2$), and $G_-$ represents a producible maximum relative acceleration (negative side) (m/s$^2$).

In the formula of the upper limit $D_+$, the first term Vr(n−1)/3.6×$T_{LR}$ shows a change amount of the inter-vehicle distance within the distance measuring period under the condition the previous relative speed is maintained between the traveling vehicles. The second term $G_+ \times (T_{LR}^2/2)$ shows a maximum change amount predictable based on the relative acceleration. The third term shows the distance measuring error. The upper limit $D_+$ is a sum of the first to third terms. The lower limit $D_-$ is determined in the same manner.

It is possible to replace the constant values $G_+$ and $G_-$ by the previous relative acceleration Ar(n−1).

Next, judgement for invalidating the distance abnormality flag will be explained.

When the distance abnormality flag is established (i.e., YES in step S5181), the control flow proceeds to step S5186 to further check whether a predetermined time Ta has passed or not after establishment of the distance abnormality flag. If time Ta has already passed (i.e., YES in step S5186), the control flow proceeds to step S5188 to invalidate the distance abnormality flag. Then, this subroutine is terminated. On the other hand, when time Ta has not passed yet (i.e., NO in step S5186), the control flow proceeds to step S5187 to check whether the objective is a new one or not. If the objective is a new one (YES in step S5187), the control flow proceeds to step S5188 to invalidate the distance abnormality flag from the reason that a previously validated distance abnormality flag should not be directly applied to a new objective. When the objective is not a new one (NO in step S5187), this subroutine is terminated.

Next, the predetermined time Ta used in step S5185 will be explained. The predetermined time Ta is a sort of waiting time required until adverse influence of the abnormal distance data given to the relative speed can be completely removed. For example, it is now assumed that the relative speed is calculated based on distance data obtained in the past n cycles. If the distance data obtained in the past n cycles include an abnormal data, calculation of the relative acceleration should be suspended until adverse influence of this abnormal data is completely removed.

Returning to the explanation of FIG. 16, it is checked in step S519 whether the distance abnormality flag is invalidated or not based on the judgement result obtained in step S518. If the distance abnormality flag is invalidated (i.e., YES in step S519), the control flow proceeds to step S520 to identify the vehicle detecting condition as being normal. Then, this subroutine is terminated. On the other hand, when the distance abnormality flag is validated (i.e., NO in step S519), the control flow proceeds to step S521 to identify the vehicle detecting condition as being abnormal. Then, this main routine is terminated.

Figure 21:
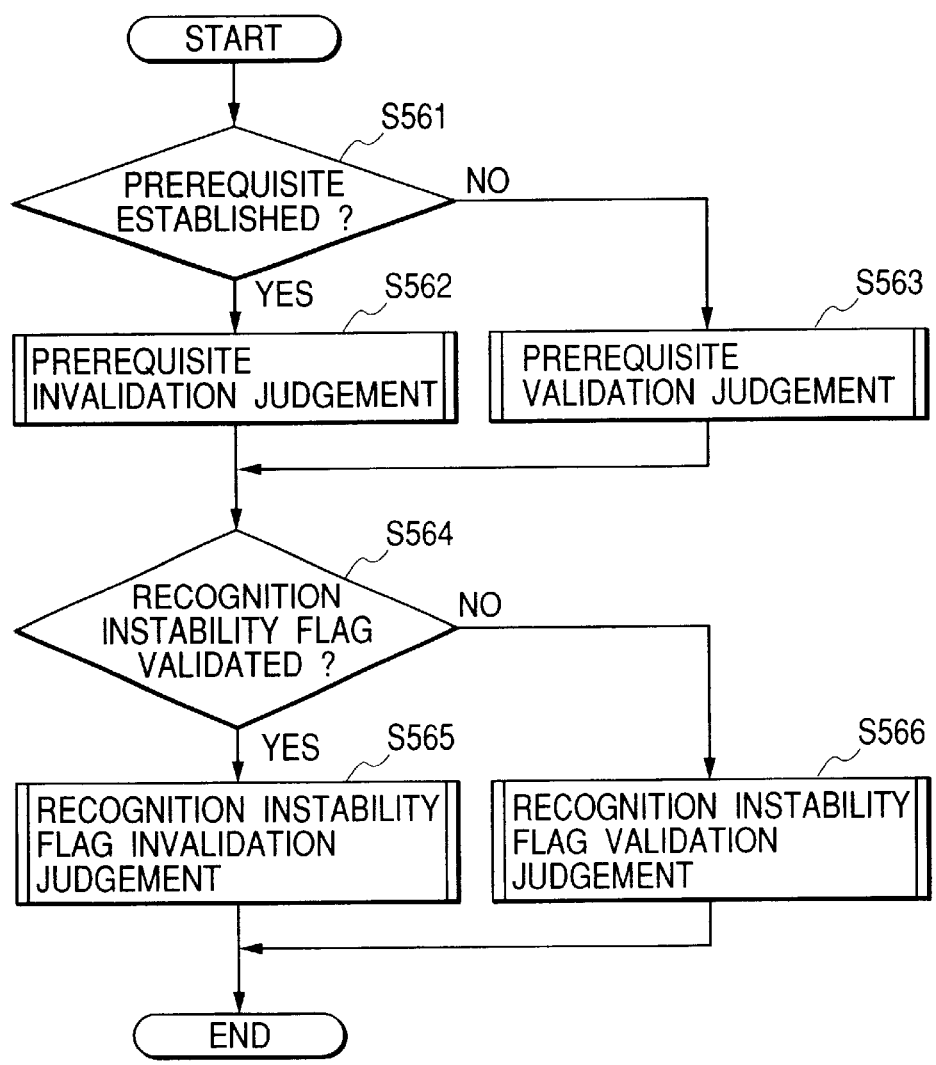
FIG. 21 is a flowchart showing details of recognition instability judgement performed in the relative acceleration calculating subroutine shown in FIG. 14.

FIG. 21 shows details of the recognition instability judgement performed in step S56 of FIG. 14.

FIG. 21 is a flowchart showing various judgements used for identifying recognition instability. FIGS. 22A, 22B, 23A and 23B are subroutines showing details of respective judgments performed in the main routine shown in FIG. 21.

In the first step S561, it is checked whether prerequisite of the recognition instability flag is established or not. If the prerequisite is established (i.e., YES in step S561), the control flow proceeds to step S562 to perform prerequisite invalidation judgement. On the other hand, when the prerequisite is not established (i.e., NO in step S561), the control flow proceeds to step S563 to perform prerequisite validation judgement. In the initial control cycle, the judgement of S561 becomes NO since no prerequisite is validated in the initial condition.

After finishing the processing of step S562 or S563, the control flow proceeds to step S564 to further check whether the recognition instability flag is validated or not. If the recognition instability flag is validated (i.e., YES in step S564), the control flow proceeds to step S565 to perform recognition instability flag in validation judgement. On the other hand, when the recognition instability flag is not validated (i.e., NO in step S564), the control flow proceeds to step S566 to perform recognition instability flag validation judgement.

Figure 22A:
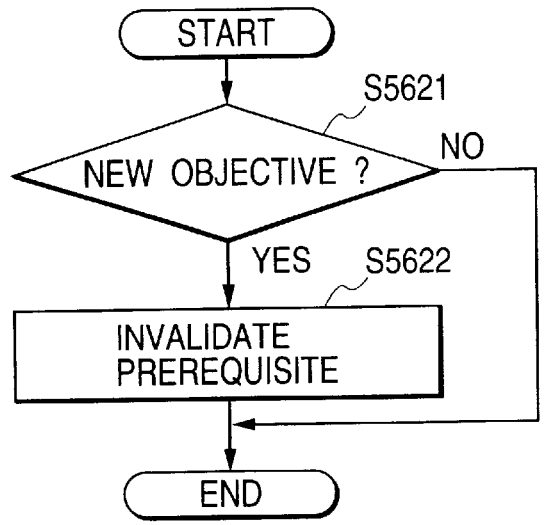
FIG. 22A is a flowchart showing details of prerequisite invalidation judgement performed in the recognition instability judgement subroutine shown in FIG. 21.

FIG. 22A shows details of the prerequisite invalidation judgement performed in step S562.

First, it is judged in step S5621 whether the objective is a new one or not. If the objective is a new one (i.e., YES in step S5621), the control flow proceeds to step S5622 to invalidate the prerequisite for the recognition instability flag. On the other hand, when the objective is not a new one (i.e., NO in step S5621), this subroutine is terminated.

Figure 22B:
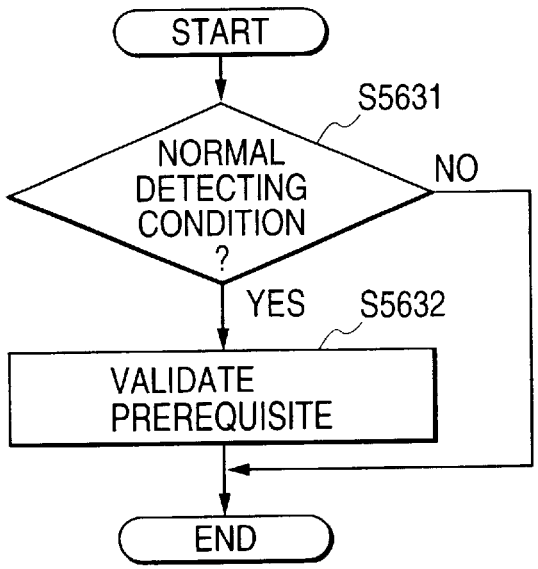
FIG. 22B is a flowchart showing details of prerequisite validation judgement performed in the recognition instability judgement subroutine shown in FIG. 21.

FIG. 22B shows details of the prerequisite validation judgement performed in step S563.

First, it is judged in step S5631 whether the vehicle detecting condition is normal or not. If the vehicle detecting condition is normal (i.e., YES in step S5631), the control flow proceeds to step S5632 to validate the prerequisite for the recognition instability flag. On the other hand, when the vehicle detecting condition is abnormal (i.e., NO in step S5631), this subroutine is terminated.

Figure 23A:
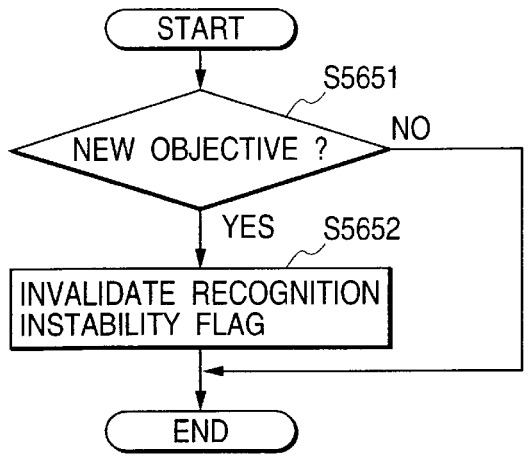
FIG. 23A is a flowchart showing details of recognition instability flag invalidation judgement performed in the recognition instability judgement subroutine shown in FIG. 21.

FIG. 23A shows details of the recognition instability flag invalidation judgement performed in step S565.

First, it is judged in step S5651 whether the objective is a new one or not. If the objective is a new one (i.e., YES in step S5651), the control flow proceeds to step S5652 to invalidate the recognition instability flag. On the other hand, when the objective is not a new one (i.e., NO in step S5651), this subroutine is terminated.

Figure 23B:
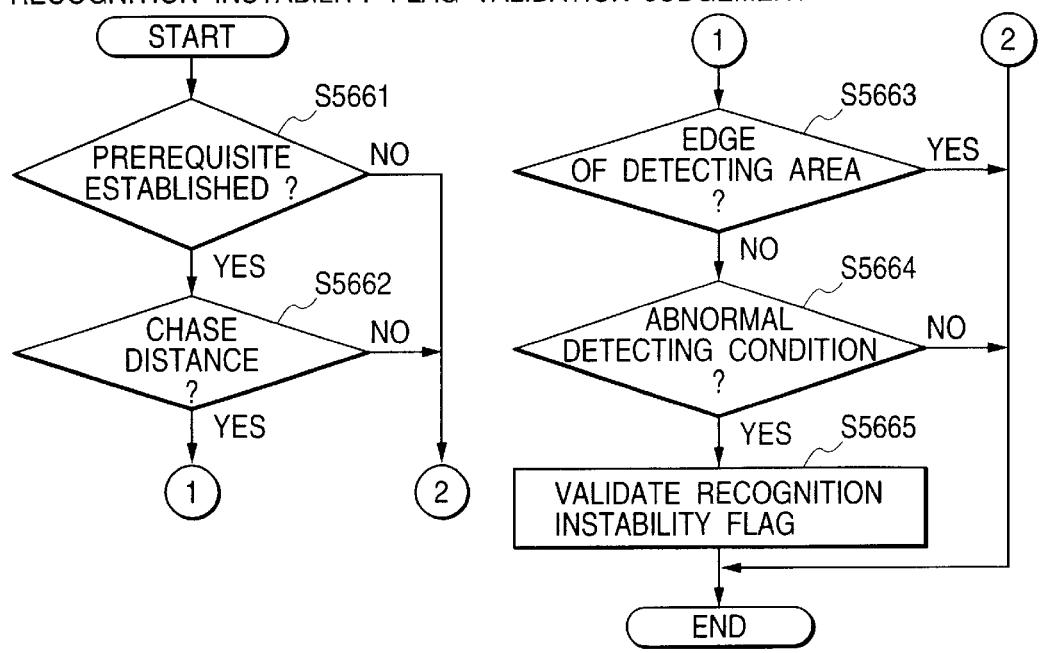
FIG. 23B is a flowchart showing details of recognition instability flag validation judgement performed in the recognition instability judgement subroutine shown in FIG. 21.

FIG. 23B shows details of the recognition instability flag validation judgement performed in step S566.

First, it is judged in step S5661 whether the prerequisite for the recognition instability flag is established or not. If the prerequisite is not established (i.e., NO in step S5661), this subroutine is terminated. On the other hand, when the prerequisite is established (i.e., YES in step S5661), the control flow proceeds to step S5662 to further check whether the inter-vehicle distance is a chase distance or not. If the inter-vehicle distance is not a chase distance (i.e., NO in step S5662), this subroutine is terminated. On the other hand, when the inter-vehicle distance is a chase distance (i.e., YES in step S5662), the control flow proceeds to step S5663 to further check whether the objective is on an edge of an detecting area or not. If the objective is on the edge of the detecting area (i.e., YES in step S5663), this subroutine is terminated. On the other hand, when the objective is not on the edge of the detecting area (i.e., NO in step S5663), the control flow proceeds to step S5664 to further check whether the vehicle detecting condition is abnormal or not. If the vehicle detecting condition is normal (i.e., NO in step S5664), this subroutine is terminated. On the other hand, when the vehicle detecting condition is abnormal (i.e., YES in step S5664), the control flow proceeds to step S5665 to validate the recognition instability flag. In this manner, the recognition instability flag can be validated only when all of the judgement conditions in steps S5661, S5662, S5663, and S5664 are established.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An inter-vehicle control apparatus comprising:

accelerating/decelerating means installed on a controlled vehicle for accelerating and decelerating said controlled vehicle, objective recognizing means for calculating at least a relative position and a relative speed of an objective to be recognized with respect to said controlled vehicle, selecting means for selecting a preceding vehicle traveling ahead of said controlled vehicle based on recognition result obtained by said objective recognizing means, inter-vehicle control means for calculating an inter-vehicle control amount based on a difference between an actual inter-vehicle physical amount representing an actual distance between the controlled vehicle and said preceding vehicle selected by said selecting means and a target inter-vehicle physical amount representing a target distance between the selected preceding vehicle and the controlled vehicle, and a relative speed between the controlled vehicle and the selected preceding vehicle, and then actuating said accelerating/decelerating means based on the calculated inter-vehicle control amount, thereby accelerating or decelerating said controlled vehicle so as to maintain an appropriate distance between two traveling vehicles, wherein said inter-vehicle control apparatus further comprises:

analyzing means for analyzing the recognition result obtained by said objective recognizing means to judge whether the objective corresponding to said preceding vehicle selected by said selecting means is correctly detected as a vehicle or not; and correcting means for calculating a relative acceleration based on the relative speed calculated by said objective recognizing means only when analysis result of said analyzing means shows properness of said objective as a vehicle, and correcting said inter-vehicle control amount based on the calculated relative acceleration, so that said inter-vehicle control means can control the distance between said preceding vehicle and said controlled vehicle based on the inter-vehicle control amount corrected by said correcting means, wherein said correcting means applies guard processing to the calculated relative acceleration so that the relative acceleration value can be limited by at least one of upper and lower limit values which are determined considering actual relative acceleration of ordinary vehicles, and said correcting means corrects said inter-vehicle control amount based on the relative acceleration being applied the guard processing.

2. The inter-vehicle control apparatus in accordance with claim 1, wherein said analyzing means judges that the objective corresponding to said preceding vehicle is correctly detected as a vehicle when presence of said objective is recognized continuously for a predetermined time after said objective is newly detected by said objective recognizing means.

3. The inter-vehicle control apparatus in accordance with claim 1, wherein said analyzing means judges that the objective corresponding to said preceding vehicle is correctly detected as a vehicle when the relative acceleration obtained based on the relative speed calculated by said objective recognizing means is within a predetermined range applicable to ordinary vehicles.

4. The inter-vehicle control apparatus in accordance with claim 1, wherein said analyzing means judges that the objective corresponding to said preceding vehicle is correctly detected as a vehicle when a present distance of said preceding vehicle calculated by said objective recognizing means is judged to be an appropriate value based on at least a previously calculated distance value and distance calculating accuracy of said objective recognizing means.

5. The inter-vehicle control apparatus in accordance with claim 1, wherein said objective recognizing means is capable of recognizing configuration of an objective, and said analyzing means judges that the objective corresponding to said preceding vehicle is correctly detected as a vehicle when objective configuration recognized by said objective recognizing means is recognizable as a vehicle.

6. The inter-vehicle control apparatus in accordance with claim 5, wherein said analyzing means checks both a lateral length and a longitudinal length of said objective in the judgement of configuration of said object.

7. The inter-vehicle control apparatus in accordance with claim 1, wherein
said objective recognizing means is capable of recognizing configuration of an objective, and
said analyzing means judges that the objective corresponding to said preceding vehicle is correctly detected as a vehicle when change of objective configuration recognized by said objective recognizing means is within a range applicable to ordinary vehicles.

8. The inter-vehicle control apparatus in accordance with claim 1, wherein said analyzing means judges that the objective corresponding to said preceding vehicle is correctly detected as a vehicle when the distance and the relative speed of said objective is within a range applicable to ordinary traffic environment.

9. The inter-vehicle control apparatus in accordance with claim 1, wherein said analyzing means judges that the objective corresponding to said preceding vehicle is correctly detected as a vehicle only when all of conditions are satisfied in a plurality of judgements.

10. The inter-vehicle control apparatus in accordance with claim 1, wherein
said correcting means applies filter processing to the calculated relative acceleration to correct said inter-vehicle control amount based on the relative acceleration being applied the filter processing, and
said filter processing is performed by using a weak filtering factor when sharp response is necessary and by using a strong filtering factor when sharp response is not necessary, wherein a situation requiring sharp response is judged by checking whether or not a distance from the controlled vehicle to said preceding vehicle is equal to or smaller than a predetermined value and whether or not an absolute value of the relative speed is equal to or smaller than a predetermined value.

11. The inter-vehicle control apparatus in accordance with claim 10, wherein said correcting means performs the filter processing with the strong filtering factor, after it is once judged that said preceding vehicle is correctly detected as a vehicle, if it is later judged that the preceding vehicle is incorrectly detected as a vehicle even if said preceding vehicle is present at an appropriate position where said preceding vehicle is accurately detectable.

12. The inter-vehicle control apparatus in accordance with claim 1, wherein said correcting means multiplies said relative acceleration by a predetermined gain and corrects said inter-vehicle control amount based on the relative acceleration being gain multiplied.

13. The inter-vehicle control apparatus in accordance with claim 12, wherein said gain is set to a relatively small value when said preceding vehicle is far from said controlled vehicle than a predetermined distance.

14. The inter-vehicle control apparatus in accordance with claim 12, wherein said gain is set to a relatively large value when said relative acceleration is a negative value compared with a gain value used when said relative acceleration is a positive value.

15. The inter-vehicle control apparatus in accordance with claim 12, wherein
guard processing is applied to the relative acceleration being gain multiplied so that the relative acceleration value can be limited by at least one of upper and lower limit values, and
said inter-vehicle control amount is corrected based on the relative acceleration being applied the guard processing.

16. The inter-vehicle control apparatus in accordance with claim 1, wherein said correcting means calculates a correction amount based on said relative acceleration and corrects said inter-vehicle control amount based on the calculated correction amount.

17. The inter-vehicle control apparatus in accordance with claim 1, wherein said correcting means adds a correction amount based on the relative acceleration to a target acceleration serving as said inter-vehicle control amount.

18. An inter-vehicle warning apparatus comprising:
objective recognizing means for calculating at least a relative position and a relative speed of an objective to be recognized with respect to a controlled vehicle,
selecting means for selecting a preceding vehicle traveling ahead of said controlled vehicle based on recognition result obtained by said objective recognizing means,
warning means for generating warning when an actual inter-vehicle physical amount representing an actual distance between the preceding vehicle selected by said selecting means and the controlled vehicle is shorter than a warning physical amount representing a predetermined warning distance,
wherein said inter-vehicle warning apparatus further comprises:
analyzing means for analyzing the recognition result obtained by said objective recognizing means to judge whether the objective corresponding to said preceding vehicle selected by said selecting means is correctly detected as a vehicle or not; and
correcting means for calculating a relative acceleration based on the relative speed calculated by said objective recognizing means only when analysis result of said analyzing means shows properness of said objective as a vehicle, and correcting said warning physical amount based on the calculated relative acceleration, so that said warning means can generate warning based on the warning physical amount corrected by said correcting means,
wherein said correcting means applies guard processing to the calculated relative acceleration so that the relative acceleration value can be limited by at least one of upper and lower limit values which are determined considering actual relative acceleration of ordinary vehicles, and
said correcting means corrects said warning physical amount based on the relative acceleration being applied the guard processing.

19. The inter-vehicle warning apparatus in accordance with claim 18, wherein said analyzing means judges that the objective corresponding to said preceding vehicle is correctly detected as a vehicle when presence of said objective is recognized continuously for a predetermined time after said objective is newly detected by said objective recognizing means.

20. The inter-vehicle warning apparatus in accordance with claim 18, wherein said analyzing means judges that the objective corresponding to said preceding vehicle is correctly detected as a vehicle when the relative acceleration obtained based on the relative speed calculated by said objective recognizing means is within a predetermined range applicable to ordinary vehicles.

21. The inter-vehicle warning apparatus in accordance with claim 18, wherein said analyzing means judges that the objective corresponding to said preceding vehicle is correctly detected as a vehicle when a present distance of said preceding vehicle calculated by said objective recognizing means is judged to be an appropriate value based on at least a previously calculated distance value and distance calculating accuracy of said objective recognizing means.

22. The inter-vehicle warning apparatus in accordance with claim 18, wherein said objective recognizing means is capable of recognizing configuration of an objective, and said analyzing means judges that the objective corresponding to said preceding vehicle is correctly detected as a vehicle when objective configuration recognized by said objective recognizing means is recognizable as a vehicle.

23. The inter-vehicle warning apparatus in accordance with claim 22, wherein said analyzing means checks both a lateral length and a longitudinal length of said objective in the judgement of configuration of said object.

24. The inter-vehicle warning apparatus in accordance with claim 18, wherein said objective recognizing means is capable of recognizing configuration of an objective, and said analyzing means judges that the objective corresponding to said preceding vehicle is correctly detected as a vehicle when change of objective configuration recognized by said objective recognizing means is within a range applicable to ordinary vehicles.

25. The inter-vehicle warning apparatus in accordance with claim 18, wherein said analyzing means judges that the objective corresponding to said preceding vehicle is correctly detected as a vehicle when the distance and the relative speed of said objective is within a range applicable to ordinary traffic environment.

26. The inter-vehicle warning apparatus in accordance with claim 18, wherein said analyzing means judges that the objective corresponding to said preceding vehicle is correctly detected as a vehicle only when all of conditions are satisfied in a plurality of judgements.

27. The inter-vehicle warning apparatus in accordance with claim 18, wherein said correcting means applies filter processing to the calculated relative acceleration to correct said warning physical amount based on the relative acceleration being applied the filter processing, and said filter processing is performed by using a weak filtering factor when sharp response is necessary and by using a strong filtering factor when sharp response is not necessary, wherein situation requiring sharp response is judged by checking whether or not a distance from the controlled vehicle to said preceding vehicle is equal to or smaller than a predetermined value and whether or not an absolute value of the relative speed is equal to or smaller than a predetermined value.

28. The inter-vehicle warning apparatus in accordance with claim 27, wherein said correcting means performs the filter processing with the strong filtering factor, after it is once judged that said preceding vehicle is correctly detected as a vehicle, if it is later judged that the preceding vehicle is incorrectly detected as a vehicle even if said preceding vehicle is present at an appropriate position where said preceding vehicle is accurately detectable.

29. The inter-vehicle warning apparatus in accordance with claim 18, wherein said correcting means multiplies said relative acceleration by a predetermined gain and corrects said warning physical amount based on the relative acceleration being gain multiplied.

30. The inter-vehicle warning apparatus in accordance with claim 29, wherein said gain is set to a relatively small value when said preceding vehicle is far from said controlled vehicle than a predetermined distance.

31. The inter-vehicle warning apparatus in accordance with claim 29, wherein said gain is set to a relatively large value when said relative acceleration is a negative value compared with a gain value used when said relative acceleration is a positive value.

32. The inter-vehicle warning apparatus in accordance with claim 29, wherein guard processing is applied to the relative acceleration being gain multiplied so that the relative acceleration value can be limited by at least one of upper and lower limit values, and said warning physical amount is corrected based on the relative acceleration being applied the guard processing.

33. The inter-vehicle warning apparatus in accordance with claim 18, wherein said correcting means calculates a correction amount based on said relative acceleration and corrects said warning physical amount based on the calculated correction amount.

34. The inter-vehicle warning apparatus in accordance with claim 18, wherein said correcting means adds a correction amount based on the relative acceleration to the warning distance serving as said warning physical amount.

* * * * *